US012510426B2

(12) United States Patent
Lu et al.

(10) Patent No.: US 12,510,426 B2
(45) Date of Patent: Dec. 30, 2025

(54) FORCE SENSORS AND DEVICES INCORPORATING FORCE SENSORS

(71) Applicant: NATIONAL UNIVERSITY OF SINGAPORE, Singapore (SG)

(72) Inventors: Zeyu Lu, Singapore (SG); Haoyong Yu, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 74 days.

(21) Appl. No.: 18/286,940

(22) PCT Filed: Jun. 6, 2022

(86) PCT No.: PCT/SG2022/050387
§ 371 (c)(1),
(2) Date: Oct. 13, 2023

(87) PCT Pub. No.: WO2023/277794
PCT Pub. Date: Jan. 5, 2023

(65) Prior Publication Data
US 2024/0210260 A1    Jun. 27, 2024

(30) Foreign Application Priority Data
Jun. 29, 2021  (SG) ............................ 10202107135Y

(51) Int. Cl.
*B25J 9/16* (2006.01)
*B25J 15/10* (2006.01)
(Continued)

(52) U.S. Cl.
CPC ........... *G01L 5/0061* (2013.01); *B25J 9/1633* (2013.01); *B25J 15/10* (2013.01); *G01L 1/122* (2013.01)

(58) Field of Classification Search
USPC .................................................. 700/245–264
See application file for complete search history.

(56) References Cited

U.S. PATENT DOCUMENTS

| 2007/0248799 | A1* | 10/2007 | DeAngelis | ......... | H03K 17/9622 |
| | | | | | 428/209 |
| 2008/0106258 | A1* | 5/2008 | Torres-Jara | ............. | G01L 5/226 |
| | | | | | 324/207.2 |

(Continued)

FOREIGN PATENT DOCUMENTS

| JP | 2006-208248 A | 8/2006 | | |
| WO | WO-2022111799 A1 * | 6/2022 | ............. | G01L 5/228 |

OTHER PUBLICATIONS

Y. Yan et al., "Soft magnetic skin for super-resolution tactile sensing with force self-decoupling", Science Robotics, Feb. 24, 2021, vol. 6, No. 51, pp. 1-12, [Retrieved on Jan. 1, 2023 O] <DOI: 10.1126/SCIROBOTICS.ABC8801 >.

(Continued)

*Primary Examiner* — Jonathan L Sample
(74) *Attorney, Agent, or Firm* — HARNESS, DICKEY & PIERCE, P.L.C.

(57) ABSTRACT

A force sensor comprising a contact arrangement for transmitting a contact force to a force sensor assembly. The force sensor assembly comprising a first sensor sensing, and producing an output from, a normal contact force component of the contact force; and a body moveable on transmission of the contact force to the force sensor assembly; and a second sensor for sensing, and producing an output from, a relative displacement of the body relative to the second sensor, the a tri-axis contact force being determined from the relative displacement.

16 Claims, 17 Drawing Sheets

(51) Int. Cl.
*G01L 1/12* (2006.01)
*G01L 5/00* (2006.01)

(56) References Cited

U.S. PATENT DOCUMENTS

| | | | | |
|---|---|---|---|---|
| 2012/0247226 | A1* | 10/2012 | Muroyama | G01L 1/142 |
| | | | | 73/862.046 |
| 2013/0319135 | A1* | 12/2013 | Okada | G01L 1/2206 |
| | | | | 73/862.043 |
| 2015/0290795 | A1* | 10/2015 | Oleynik | B25J 9/0081 |
| | | | | 700/257 |
| 2017/0086704 | A1* | 3/2017 | Gwin | A61B 5/1038 |
| 2017/0239821 | A1* | 8/2017 | Lessing | B25J 15/12 |
| 2018/0073942 | A1* | 3/2018 | Wu | G01L 5/165 |
| 2018/0297214 | A1* | 10/2018 | Lessing | B25J 9/142 |
| 2019/0178736 | A1* | 6/2019 | Shimizu | G01L 1/127 |
| 2019/0247050 | A1* | 8/2019 | Goldsmith | A61F 2/82 |
| 2020/0049580 | A1* | 2/2020 | Yin | G01L 1/2287 |
| 2021/0181002 | A1* | 6/2021 | Huang | G01L 1/205 |
| 2021/0252721 | A1* | 8/2021 | Alspach | B25J 15/0033 |
| 2021/0262879 | A1* | 8/2021 | Kitamura | G01B 7/16 |
| 2021/0394360 | A1* | 12/2021 | Hwang | B25J 9/1612 |
| 2022/0034728 | A1* | 2/2022 | Katsuhara | G01L 5/165 |
| 2022/0065714 | A1* | 3/2022 | Nohno | B25J 9/1633 |
| 2022/0161427 | A1* | 5/2022 | Yerazunis | B25J 9/1674 |
| 2022/0161444 | A1* | 5/2022 | Yerazunis | B25J 9/104 |
| 2022/0252475 | A1* | 8/2022 | Hussein | G01L 5/228 |
| 2022/0276038 | A1* | 9/2022 | Shen | G01R 33/077 |
| 2022/0402144 | A1* | 12/2022 | Strohmayr | G01L 1/146 |

OTHER PUBLICATIONS

C. Larson et al., "A Deformable Interface for Human Touch Recognition Using Stretchable Carbon Nanotube Dielectric Elastomer Sensors and Deep Neural Networks", Soft Robotics, Oct. 4, 2019, vol. 6, No. 5, pp. 611-620, [Retrieved on Jan. 1, 2023 O] <DOI: 10.1089/SOR0.2018.0086>.

J. Park et al., "Fingertip skin-inspired microstructured ferroelectric skins discriminate static/dynamic pressure and temperature stimuli", Science Advances, Oct. 30, 2015, vol. 1, No. 9, pp. 1-13, [Retrieved on Jan. 1, 2023 O] <DOI: 10.1126/SCIADV.1500661 >.

International Search Report of the International Searching Authority, issued in PCT/SG2022/050387, mailed Jan. 18, 2023; ISA/SG.

* cited by examiner

1. Caging  #2. Parallel pinch

3. Thumb-3 Finger  #4. Clasped  #5. T-shape grasping

FORCE SENSORS AND DEVICES INCORPORATING FORCE SENSORS

CROSS-REFERENCE TO RELATED APPLICATIONS

This application is a U.S. National Phase Application under 35 U.S.C. 371 of International Application No. PCT/SG2022/050387, filed on Jun. 6, 2022, which claims the benefit of Singaporean patent application number 10202107135Y, filed on Jun. 29, 2021. The entire disclosures of the above applications are incorporated herein by reference.

TECHNICAL FIELD

This disclosure generally relates to force sensors, robotic devices incorporating a force sensor and methods of tactile force sensing.

BACKGROUND

This background description is provided for the purpose of generally presenting the context of the disclosure. Contents of this background section are neither expressly nor impliedly admitted as prior art against the present disclosure.

Tactile sensing technologies enable robotic operations to perform complex tasks and gather information in complex environments. Several tactile sensing technologies based on piezoresistive, optical, capacitive, barometric, or magnetic principles are known. Tactile sensing may involve several kinds of force sensing including: normal forces and shear forces. The forces may be applied at one point or may be distributed over a larger area. Different operations or environments may require measurement of forces at different resolutions. In some robotic operations, it may be beneficial to obtain the location of a contact force.

Known sensors for extrinsic tactile force sensing and contact location estimation do not sufficiently perform force sensing at a sufficiently high resolution and dimensionality to meet the needs of modern high sensitivity and complex robotics. Known sensor arrays are also bulky and are subjected to physical size and weigh constraints limiting their applicability of environments where size and weight limitations do not matter.

It is desired to address or ameliorate one or more disadvantages or limitations associated with the prior art, or to at least provide a useful alternative.

SUMMARY

Disclosed herein is a force sensor comprising:
a contact arrangement for transmitting a contact force to a force sensor assembly,
the force sensor assembly comprising:
a first sensor sensing, and producing an output from, a normal contact force component of the contact force; and
a body moveable on transmission of the contact force to the force sensor assembly; and
a second sensor for sensing, and producing an output from, a relative displacement of the body relative to the second sensor, a tri-axis contact force being determined from the relative displacement.
The contact arrangement may comprise a deformable substrate that deforms under the contact force.

The deformable substrate may be an elastomeric substrate.

The body may comprise a magnet and the second sensor is one or more Hall effect sensors. The body may comprise a plurality of magnets. The body may comprise a rigid layer comprising the magnet or magnets, and a deformable layer one side of which is fixed to the rigid layer and an opposing side of which is fixed relative to the Hall effect sensor, the deformable layer permitting displacement, under the contact force, of the rigid layer relative to the Hall effect sensor.

The second sensor may be housed in a chamber. The force sensor may further comprise a base structure for incorporating the force sensor into a device, wherein the base chamber is incorporated into, or abuts, the base structure.

The body may be embedded in a substrate between the first sensor from the second sensor.

The first sensor may comprise one or more sensors each being one of a matrix piezoresistive sensor, a piezoelectric sensor, a capacitive sensor, a triboelectric sensor, and an optical sensor.

The force sensor may form a multi-layer structure with a top layer comprising the contact arrangement, second layer and a first layer between the top layer and second layer, the first layer and second layer comprising respectively different ones of the first sensor and second sensor.

The body may be disposed between the first layer and second layer. The second sensor may be in the second layer.

Also disclosed is a force sensor device comprising an array of force sensors as described above.

Also disclosed is a robotic device comprising the force sensor as described above, or the force sensor device as described above.

The robotic device may be a gripper.

Also disclosed is a prosthesis comprising the force sensor described above, or the force sensor device described above.

The prosthesis may be one of a prosthetic arm, prosthetic upper limb or prosthetic lower limb.

Also disclosed herein is a robotic hand comprising:
a palm portion;
a plurality of finger portions;
a write portion;
a plurality of force sensors as described above, located at contact points for contacting an object during use; and
a processor for:
receiving an output from each of the first sensor and second sensor;
determining from the output, one or more fast-adapting (FA) responses and one or more slow-adapting (SA) responses; and
identifying an extrinsic contact state (ECS) of the object based on the one or more FA responses and one or more SA responses.

Identifying the ECS may comprise determining a first order response and a second order response from the one or more FA responses and one or more SA responses.

The first order response may comprise one or both of a normal force and a shear force, and the second order response may comprise a time-varying pattern.

Also disclosed herein is a computer implemented method for identification of extrinsic contact states (ECSs) of a robotic hand with respect to an object, the method comprising: receiving tactile sensing signals from each finger section of the robotic hand, the tactile sensing signals comprising fast-adapting (FA) response signals and slow-adapting (SA) response signals; processing the tactile sensing signals by a decoder model to determine tactile event data associated with each finger section of the robotic hand; processing the determined tactile event data by a machine leaning model to determine an ECS of the robotic hand with respect to the object.

BRIEF DESCRIPTION OF THE DRAWINGS

Exemplary embodiments of the present invention are illustrated by way of example in the accompanying drawings in which like reference numbers indicate the same or similar elements and in which.

DETAILED DESCRIPTION

Figure 1:
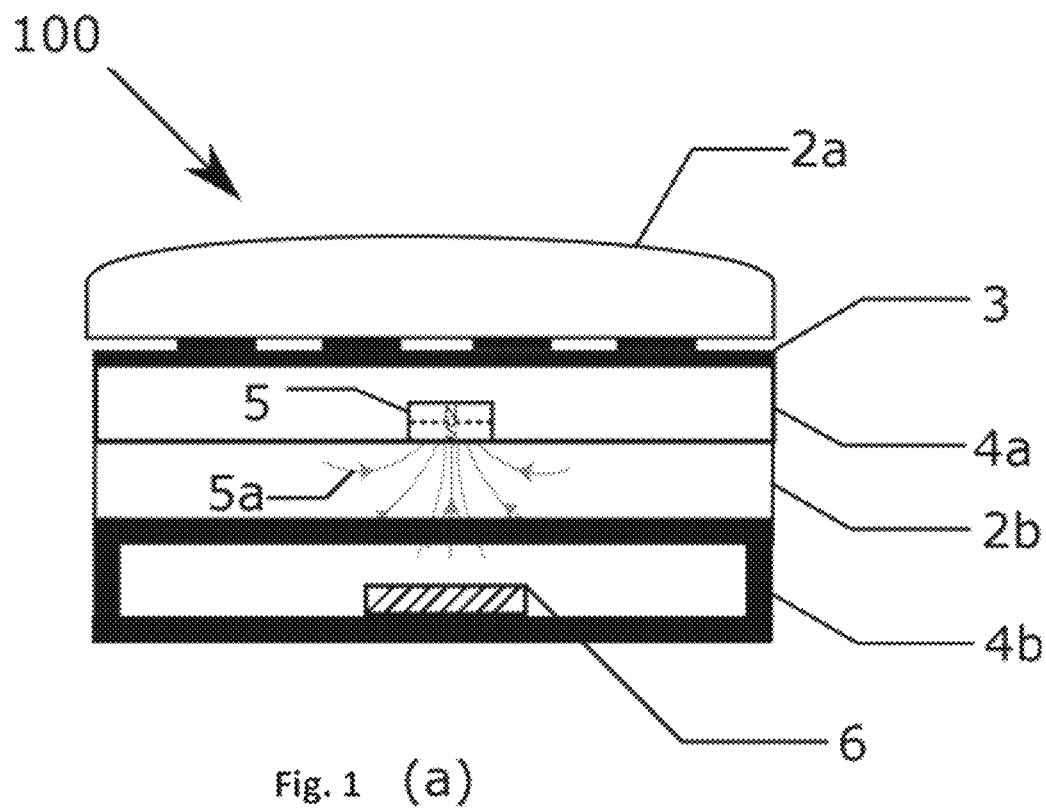
FIG. 1 (a) illustrates a side view of a force sensor, which illustrates the multilayer structure and its components; (b) illustrates a schematic diagram of the force sensor.
Figure 1:
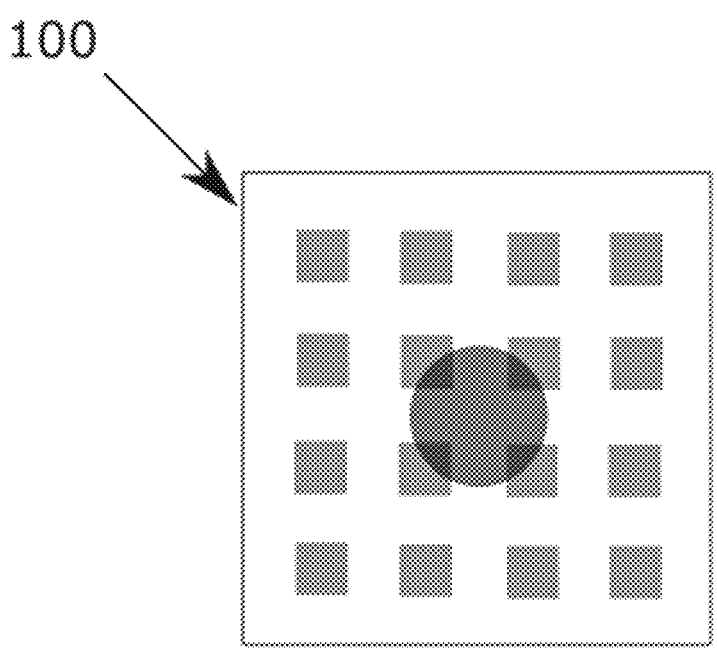

This disclosure relates to force sensors (also referred to as GTac or GTac sensor or a tactile sensor or a tactile force sensor) for tactile force sensing. The disclosure also relates to methods of measuring matrix normal contact force and internal tri-axis forces using the GTac sensor. The GTac sensors may serve as low-cost biomimetic tactile sensor for domestic robots, where the solution can be customized depending on the needs of the robotic operation. For example, a large sensing area may be provided for robot arms and a small sensing area for robot fingertips. The GTac sensors may also be incorporated in robotic prostheses to be safely controlled on amputees. For example, the GTac sensors can be used to provide a large-area biomimetic tactile sensing capability for lower-limb prostheses and upper-limb prostheses due to high sensing capabilities, high extensibility, and low cost of its design.

GTac in some exemplary embodiments decouples dense extrinsic normal force sensing and intrinsic tri-axis force sensing capabilities mimicking the tactile sensing functions of human fingertip. GTac of some exemplary embodiments adopts a human-skin-inspired multilayer structure that consists of a matrix piezoresistive sensors, a magnetic bone structure, silicone elastomer substrates and a Hall effect sensor. Exemplary GTacs sensors can estimate dense normal contact force and contact shear force. GTacs advantageously provide improved tactile sensing in terms of sensing abilities, simplicity, sensitivity, robustness, and form factor.

Human-robot/robot-environment interactions, for example, robotic hand grasping for objects manipulation, rely on tactile sensors to estimate the contact force magnitude, contact location, and force direction, which can improve safety and robustness of objects manipulation. Therefore, the capability of estimating contact information in high resolution and dimensionality is important.

GTacs of some embodiments perceive rich contact information, namely contact force magnitude, contact force location, and contact force direction. The contact information advantageously contributes to improved safety and stability in controlling robots/human-robot interactions. While interacting with objects or human, robots are required to actively perceive the situation of interaction and make decision according to the situation. For example, contacts happen when robots touch objects. Measuring the contact force magnitude allows estimation an object's kinesthetic properties, allows adjustments for stability of grasping objects, safety of interacting with human, and effectiveness of manipulating objects. Measuring contact locations can be used to estimate the joint level torque exerted by objects. Measuring contact force direction is useful for perception in manipulating objects and for estimating stability of objects during manipulation.

The force sensors may incorporate two sensing principles: piezoresistive sensing principle and Hall effect based sensing. In some embodiments, the force sensor may include piezoresistive sensors, Hall effect sensors, magnets, 3D printed structures, and elastomer substrates. There may be provided a multilayer structure that makes the external contact force transmit from the contact surface to the sensing components of the force sensor. Signals from the sensing components can be processed to determine forces applied to the force sensor. Some force sensors may include elastomer substrates that are used to build soft contact surface and/or serve as a force transmission medium. The piezoresistive sensors respond to normal contact force by decreasing the electrical resistance at positions corresponding to the contact force. The Hall effect sensor can measure the change of local magnetic field caused by the external contact force changing position of a magnetized bone structure. The above signals all can be collected and processed by a processor or a microcontroller provided in the force sensor.

FIG. 1(a) shows side a view of a tactile force sensor 100. From the side view, the sensor 100 adopts a multilayer structure. From the top, the contact surface is on an flexible—e.g. elastomer or elastomeric—substrate 2a (also referred to as tap elastomer). The substrate 2a can deform corresponding to the contact force and transmit contact force to the next layer, i.e., matrix piezoresistive sensors 3 (also referred to as a normal force sensing laminate matrix). The pressure/mechanical strain is transmitted to a region of piezoresistive sensors 3 so that the electrical resistance is reduced at the region with pressure. In addition, the electrical resistance of 3 may be linearized with the applied pressure. Another flexible—e.g. elastomer or elastomeric—substrate 2b (also referred to as a flat elastomer) is attached on a structure—referred to as bone structure 4a—and the base chamber 4b, the rigid body comprising piezoresistive sensor 3, bone structure 4a, and magnet 5. The rigid body may therefore experience displacement in tri-axis (i.e. in three dimensions) with respect to the base chamber 4b under an applied contact force. This can change the local magnetic field 5a. In particular, the local magnetic field from magnet 5 should be able to penetrate the base chamber 4b and should be detected by the Hall effect sensor 6. The Hall effect sensor 6 used could be provided using the MLX90393 integrated circuit chip (Melexis Co. Ltd.), or any other suitable Hall effect sensor. The signals generated by the Hall effect sensor 6 can be read through an I2C bus or other communication bus. The output data generated by the Hall effect sensor 6 includes the magnetic strength value in x-y-z axis and temperature. The digital output of the Hall effect sensor 6 is read by I2C pins on Arduino Mega2560 or other processor, for determining one or both of normal and shear contact forces.

FIG. 1(b) shows the sketch of the tactile force sensor where the squares indicate the piezoresistive sensing points and the circle indicates the Hall effect sensing points or area per unit.

Figure 2:
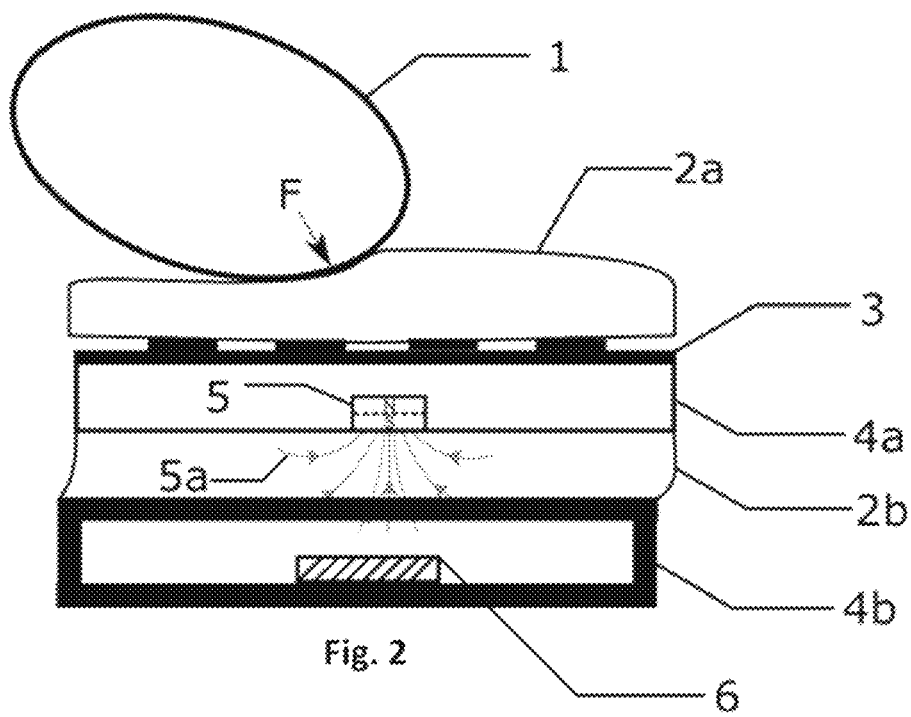
FIG. 2 illustrates a side view illustrating the anticipated deformation of elastomer substrates when the tactile sensor is in external contact force that consists of a normal force vector and a tangential force vector.

As shown in FIG. 2, an object 1 applies external force F on the contact surface of 2a. The elastomer substrate 2a is anticipated to be deformed, to transmit the contact force to a mechanical strain on 3, to transmit the contact force to a deformation of elastomer substrate 2b. In particular, the direction of the displacement vector of 4a is aligned with the direction of the tangential contact force vector. Therefore, the local magnetic field is being changed accordingly.

GTac sensor 100 can estimate the extrinsic arrayed (4×4 matrix) normal contact force in its elastomer substrate 2a (designed based on the Meissner's corpuscles of the human skin and also referred to as the fast-adaptive (FA)-I layer). The elastomer substrate 2a may be 0.5 mm thick. The sensor 100 may measure a tri-axis gross contact force in the bone structure layer 4a (designed based on Ruffini cylinders of the human skin and also referred to as the slow-adaptive (SA)-II layer). In this function, the bone structure layer 4a operates in concert with layers 2b and 4b. The SA-II layer may be 3 mm thick or any other appropriate thickness. The joint-level torque in both the FA-I and SA-II layers may be estimated based on known geometrical dimensions when an external contact force is applied on the top layer 2a. More specifically, GTac transforms the normal extrinsic contact force into the reduction of the resistance and transforms the gross tri-axis force into a local magnetic flux density change. The resistance and local magnetic flux density are measured using piezoresistive sensors and Hall sensors independently and simultaneously. Each GTac sensor 100 can obtain 19 tactile signals consisting of 16 (4×4 matrix) from the FA-I layer and 3 from the SA-II layer.

Heterogeneous Force Feedback

The contact location estimation of GTac may be obtained by a weighted average of the detected pressure at each sensing point as follows.

$$\begin{bmatrix} x_e \\ y_e \end{bmatrix} = \begin{bmatrix} \sum_{r=1}^{4} \sum_{c=1}^{4} (e \cdot c \cdot R^{r,c})/16 \\ \sum_{r=1}^{4} \sum_{c=1}^{4} (e \cdot r \cdot R^{r,c})/16 \end{bmatrix} \quad (1)$$

where $R^{r,c}$ is the signal reading from the FA-I layer in row r and column c, and e is the spatial resolution of the FA-I layer, e=2.5 mm, for example. Like human cutaneous softness, the external contact force can deform the elastomer substrate on the contact surface. This elastomer mechanically buffers the pressure in the case of sharp contact and thereafter delivers the pressure from the contact surface to the FA-I layer whose electrical resistance is reduced because of the mechanical strain. Moreover, the contact force is transmitted to the bone structure, deforming the flat elastomer relative to the base chamber. Therefore, the bone structure can move along the tri-axis relative to the Hall effect sensor, changing the local magnetic flux density. This change in the local magnetic flux density can be measured by the Hall sensor and used to estimate the shear contact force. The representation of the composition of force sensing on a GTac is the hybrid result of the FA-I and SA-II signals. The linear relationship between the tri-axis contact force and GTac sensing signals can be expressed as $$\begin{bmatrix} F_x \\ F_y \\ F_z \end{bmatrix} = \begin{bmatrix} k_x \Delta B_x + b_x \\ k_y \Delta B_y + b_y \\ k_z \left( a \Delta B_z + (1-a) \sum_{r=1}^{4} \sum_{c=1}^{4} R^{r,c} \right) + b_z \end{bmatrix} \quad (2)$$

where $\Delta B_{x,y,z}$, $k_{x,y,z}$, and $b_{x,y,z}$ are the observed changes in the local magnetic flux density relative to the initialized position, the slope and intercept of the linear fitting lines, respectively in tri-axis. Regarding the variable a, since the FA-I and SA-II layers have a redundant force sensing degree of freedom (DoF) in the z-axis, the redundancy on normal force estimations may be weighted by the FA-I layer and SA-II layer, i.e., $F_z = k_z(a\Delta B_z + (1-a)\sum_{r=1}^{4}\sum_{c=1}^{4} R^{r,c}) + b_z$ in equation (2), where $\sum_{r=1}^{4}\sum_{c=1}^{4} R^{r,c}$ is the sum of arrayed FA-I signals in the 4×4 matrix.

Fabrication and Customization

Figure 13:
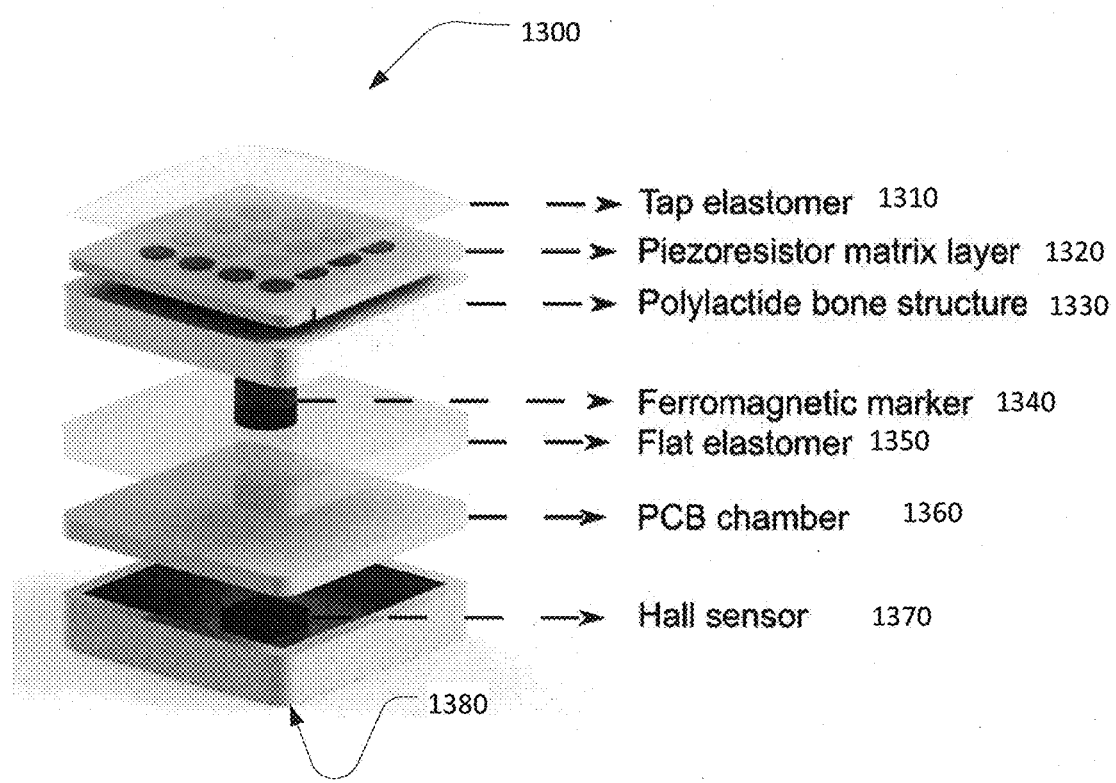
FIG. 13 illustrates a multilayered structure and characterization performance of a force sensor.

FIG. 13 illustrates a biomimetic tactile sensor GTac 1300. The design of the, adopts a multilayer structure. GTac 1300 unit consists of a flexible substrate—e.g. tap elastomer 1310—a flat elastomer 1350, a piezoresistive sensor laminate (4×4) 1320, a polylactide bone structure 1330, a cylinder neodymium (NdFeB) magnet or other magnet 1340, a base chamber 1380, and a PCB with an integrated Hall sensor 1370. The arrayed normal force sensing laminate, i.e., piezoresistive sensors 1320, forms the first layer, and an elastomer substrate 1310 is placed on one side of it as the soft contact surface. The other side of the laminate is attached to the next layer, a rigid bone structure 1330 magnetized by mounting the cylindrical NdFeB magnet 1340. Under this layer, there is a flat elastomer substrate 1350 that is attached to the base chamber 1380 that integrates the Hall effect sensor 1370. All the elastomer substrates 1310, 1350 were made by casting and drying (12 hours) liquid silicone rubber (Ecoflex 00-50, Smooth-On Inc.) in customized molds, with an elastic modulus of 83 kPa. Both layers of GTac could be customized to various shapes for different purposes. The customizable variables in GTac included the piezoresistors in FA-I layer, the bone structure, the ferromagnetic marker, the elastomers in SA-II layer as well as the PCB. All the layers could be stuck together using an adhesive, such as Cyanolube Cyanoacrylate (Electrolube Co. Ltd). The polylactide bone structures and customized molds could be printed by the Ultimaker S5 using PLA White (Ultimaker Co. Ltd.). Other materials for each component can be used as desired and the proposed materials are for illustration purposes only. The Hall sensor was an MLX90393 integrated circuit chip (Melexis Co. Ltd.). The MLX90393 Qwiic Magnetometer (SparkFun Co. Ltd.) was used in the characterization experiments.

Figure 3:
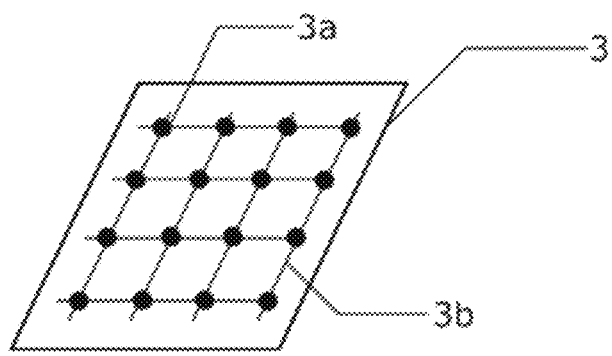
FIG. 3 illustrates a layer of matrix piezoresistive sensors that are made up of multiple cross conductive wires and flexible conductive materials whose electrical resistance changes due to applied mechanical load.

In FIG. 3, the matrix piezoresistive sensor 3 consist of a piezoresistive material 3a and conductive wires 3b. The piezoresistive materials 3a may comprise Velostat/Linqstat whose electrical resistance would be changed by applied mechanical strain. The conductive wires 3b may be made flexible so that the piezoresistive sensors 3 can be deformed into different shapes, which may help build a well compatible contact surface. The conductive wires 3b may be routed cross over rows and columns to form grid. However, none of the wires are directly in contact since the laminate made up of piezoresistive materials is in-between wires on rows and columns.

Figure 4:
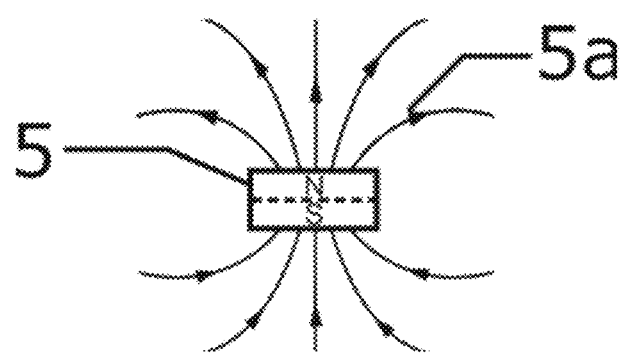
FIG. 4 illustrates a representative magnetic field vector from a cylinder magnet in which field lines point from north pole (N) to south pole (S) and the strength of magnetic field is inversely proportional to the distance from magnet.
Figure 5:
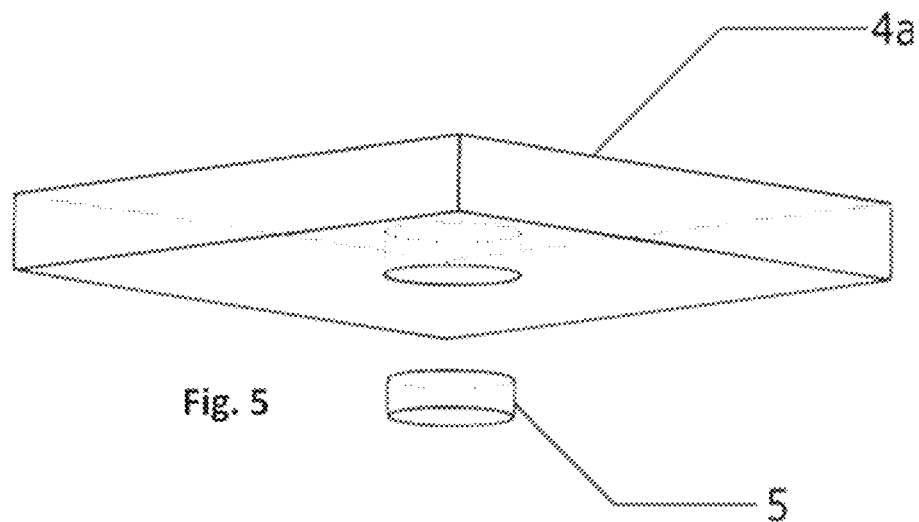
FIG. 5 illustrates a rigid bone structure that is magnetized by mounting a magnet inside, which functions as a carrier to move the magnets corresponding to the contact force.
Figure 6:
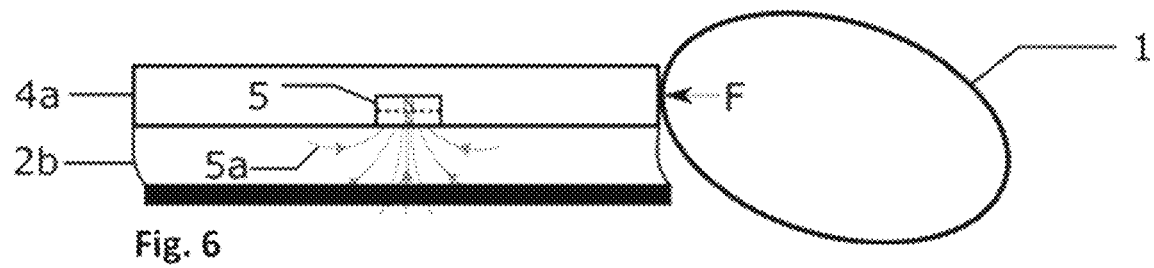
FIG. 6 illustrates the anticipated change of elastomer shape and local magnetic field while the layer of bone structure being applied by a tangential contact force (F) to the left.
Figure 7:
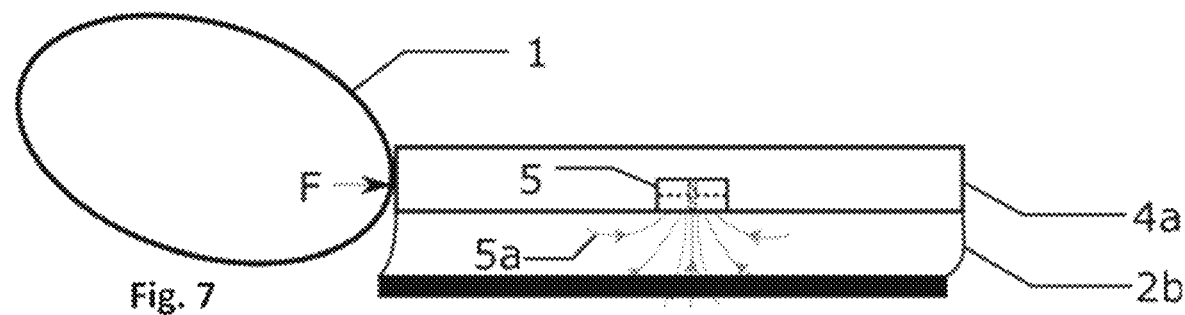
FIG. 7 illustrates the anticipated change of elastomer shape and local magnetic field while the layer of bone structure being applied by a tangential contact force (F) to the right.
Figure 8:
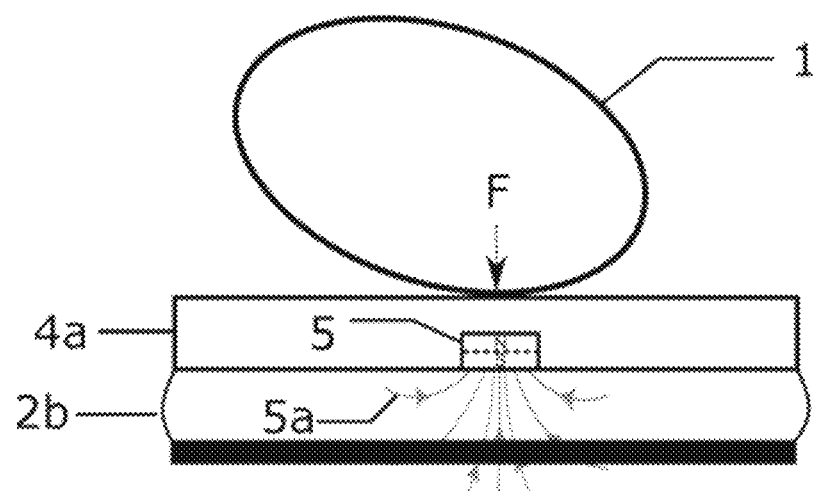
FIG. 8 illustrates the anticipated change of elastomer shape and local magnetic field while the layer of bone structure being applied by a normal contact force (F) from the top.

FIG. 4 shows that the cylinder magnet 5 generates a magnetic field 5a whose strength is inversely proportional to the distance from magnet. Notably, while other shapes of magnet may be used, a cylinder has been selected to provide radially uniform magnetic field, such that displacement in by a specific amount any lateral direction will result in a consistent and predictable change in magnetic field at the Hall sensor. FIG. 5 demonstrates that the rigid bone structure 4a is magnetized through mounting a magnet 5 so that the layer of bone structure can move with the magnetic to change the local magnetic field 5a in FIG. 2. Any pole can be top side or bottom side. The shape of bone structure is not restricted to rectangle. FIG. 6, FIG. 7 and FIG. 8 show how the shape of elastomer is expected to change if there was an external force F applied on the sides and top of bone structure 4a. The magnet 5 moves accordingly because of the deformation of elastomer 2b. Therefore, the local magnetic field 5a can respond to the external force F.

Earth Magnetic Field Cancellation

As the sensing principle of the SA-II layer is based on magnetic flux density measurement, there are magnetic disturbances (d) from two main sources, the earth's magnetic field and adjacent magnetic field. GTac of some embodiments incorporate an IMU-based method to reduce the earth magnetic field cancellation. To quantify the magnetic disturbance, such embodiments use an alternative definition of signal-to-noise-ratio (SNR) as SNR=s/(s+d), where s is the effective signal strength. The earth's magnetic field is a constant vector ($B_e$) in the environment, but unknown in the beginning (we can observe its magnetic flux density change via Hall sensor). Thus it is included in the sensor observation ($B_s$), i.e., $B_s=B_e+B_m$, where $B_m$ is the magnetic field of the magnet in GTac. Hence, $B_m=B_s-B_e$, and the contact force estimation is only related to $B_m$, i.e., $F=f(B_m)=f(B_s-B_e)$. Therefore, the solution is to determine $B_e$ and subtract it for the contact force estimation. Using the matrix multiplication of the rotation matrix, a contact vector $q_b$ in the new coordinate after orientation $R_{ab}$ can be obtained using $q_a=R_{ab}q_b$. Accordingly, $\Delta q=q_a-q_b=(R_{ab}-I)q_b$. Therefore, the constant vector of the earth's magnetic field in the environment $B_{e|b}$ can be obtained by solving the linear equation via least-squares optimization:

$$\begin{cases} \Delta B_s = (R_{ab} - I)B_{e|b} \\ B_{e|b} = \left[(R_{ab} - I)^T(R_{ab} - I)\right]^{-1}(R_{ab} - I)^T \Delta B_s \end{cases} \quad (4)$$

where $R_{ab}$ is the rotation matrix and can be obtained via inertial measurement unit (IMU) or angle encoders, and $\Delta B_s$ is the observed magnetic flux density change by the sensor.

Figure 9:
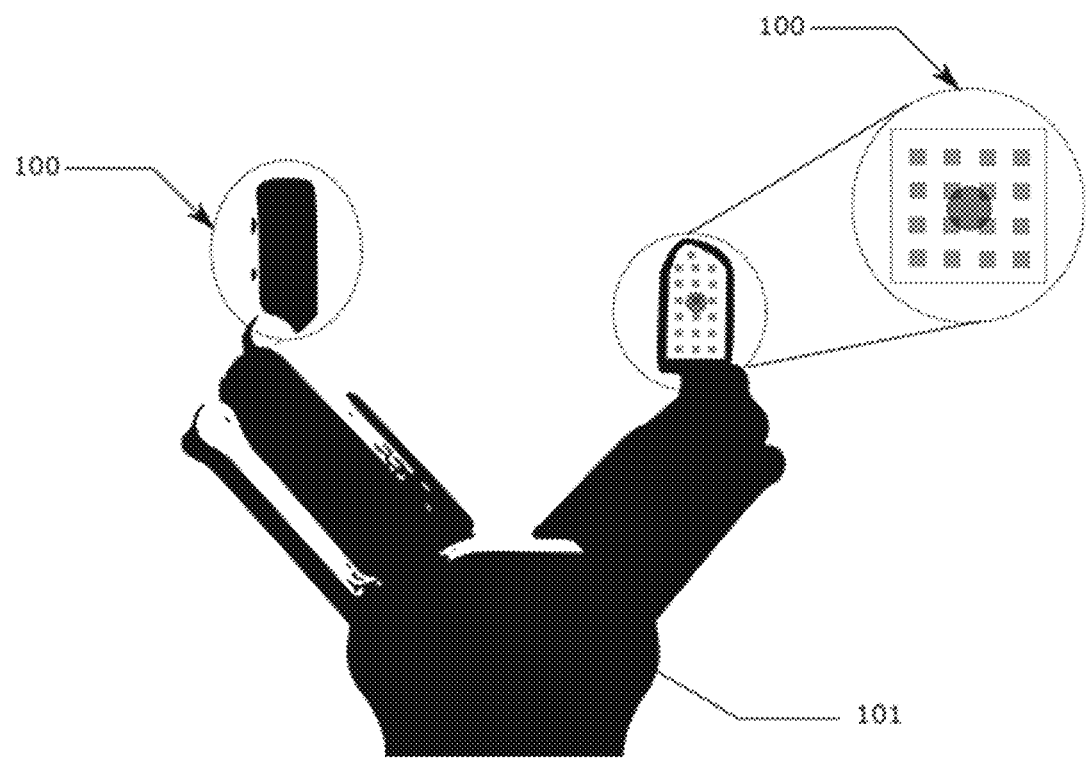
FIG. 9 illustrates an example application of the force sensor in which a robotic gripper is integrated with the force sensor.

FIG. 9 shows an example application of the force sensor integrated with a robotic gripper 101 to provide the robot a rich contact feedback for improved performance of feedback-based tasks, such as grasping. The tactile sensor 100 can estimate dense normal contact force and tri-axis contact force. The contact surface of 100 may face towards to the contact surface of tactile sensor 100 on another finger to have a compatible grasping contact. The application of this invention includes, but is not limited to, integrating with finger of gripper.

Figure 11:
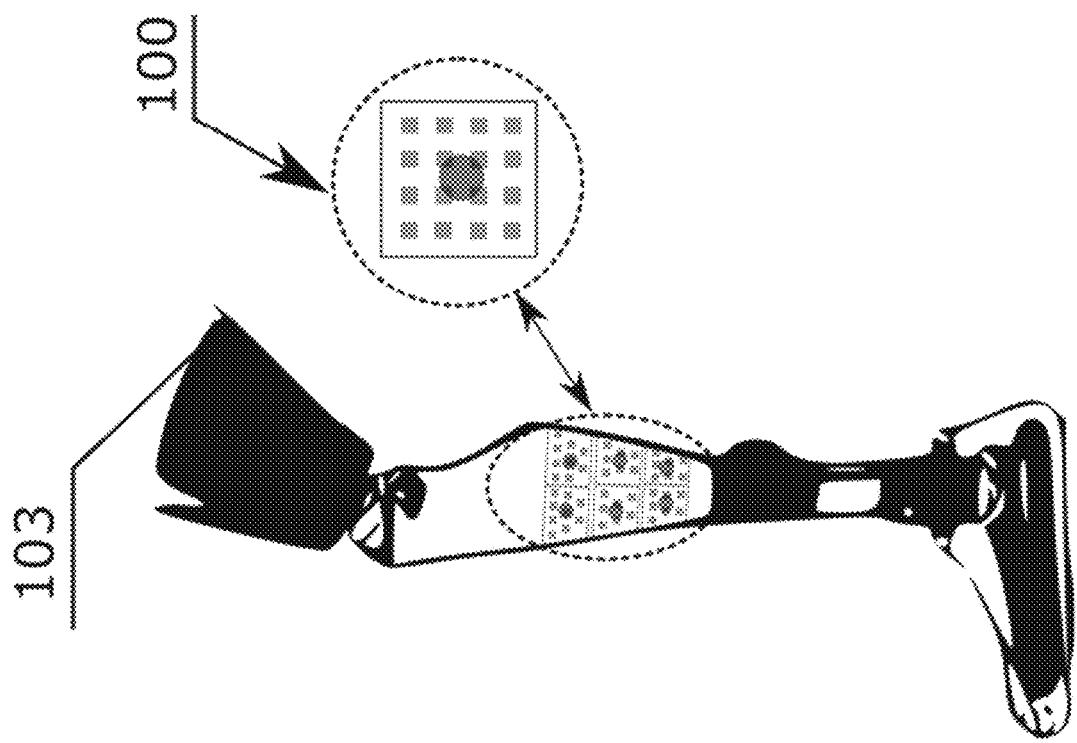
FIG. 11 illustrates another example application of the force sensor in which a robotic leg/prosthetic leg is integrated with the force sensor as a tactile sensorized fingertip.
Figure 10:
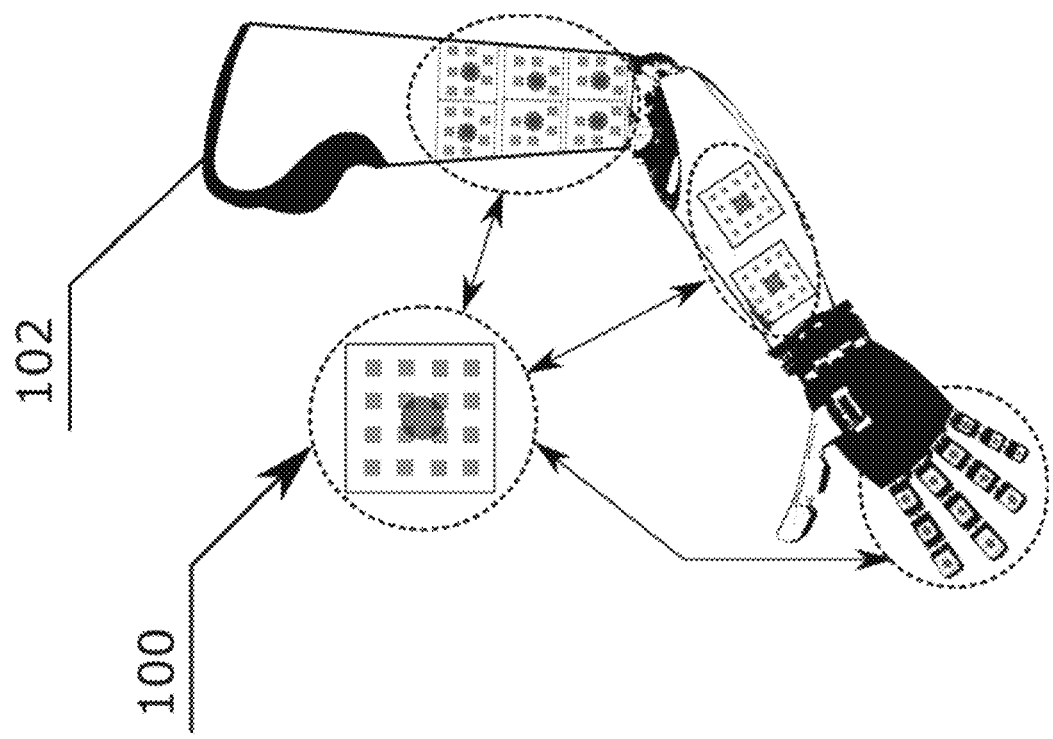
FIG. 10 illustrates another example application of the force sensor in which a robotic hand/prosthetic hand is integrated with the force sensor as a tactile sensorized fingertip.

FIG. 10 and FIG. 11 depict two example applications of this invention utilizing some embodiments of the tactile force sensor. In this embodiment, the tactile force sensor 100 is integrated with an upper limb prosthesis/anthropomorphic robotic hand and arm 102 and lower limb prosthesis 103. The tactile sensor 100 can be used to increase the human-robot-interaction safety of upper/lower limb prosthesis by providing feedback of unconscious collision on the arm/shank and grasping stability when manipulating the object to avoid dropping objects. From the aspect of sensing capabilities, the tactile sensor can output signals from matrix piezoresistive sensor and signals from Hall effect sensor wherein the final output is mixture results of both the two signals. The final mixture signals can be used to infer the joint-level torque on each fingertip since the external contact location and tri-axis force can be estimated from the two signals, respectively. When tactile sensing for larger area is needed, such as palm of prosthesis/robotic hand 102, prosthesis/robotic arm 102, and prosthesis shank, the principle of this invention can be extended. In such cases, the spatial resolution of matrix piezoresistive sensors and the Hall effect sensors should be adjusted accordingly. While most of the embodiments explained above are with respect to matrix piezoresistive sensor, the same principle may also be applied to develop such tactile force sensor using capacitive sensors, piezoelectric sensors, triboelectric sensors, optical sensors or other similar sensors.

Data Acquisition and Processing

Figure 12:
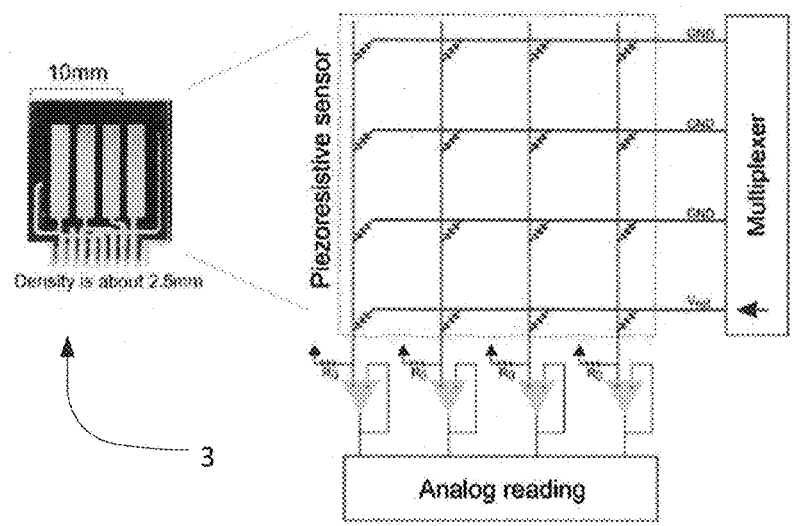
FIG. 12 illustrates a 4 by 4 matrix piezoresistive sensors as the FA-I layer in a force sensor and an associated circuit schematic.
Figure 12:
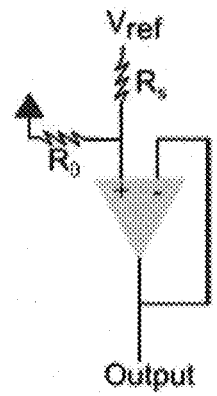

FIG. 12(*a*) illustrates a reading-out circuits of matrix piezoresistive sensors. FIG. 12(*b*) illustrates a follower-based signal isolation circuits. Rs is a piezoresistive sensor that has a range of resistance $R_s$ in [5 k, 100 k] ohm, $R_0$ is 10 k ohm. In the circuit for reading out the matrix piezoresistive sensors of FIG. 12, there is a 4-channel multiplexer that switches the row on high voltage at defined time intervals. There are four operational amplifiers with 10 k ohm pull-up resistor to function as voltage follower and isolate the analog reading from other disturbance sources. The 4-channel multiplexer is connected to 4 digital I/O pins of Arduino Mega2560. The signals are directly read by 4 analog I/O pins.

Only one row may be connected to Vref at each moment. The remaining rows are shorted to the ground (GND). Regarding the force sensing principle of GTac sensors each GTac can obtain 16 FA-I signals and 3 SA-II signals. Since the Hall sensor in the SA-II layer of GTac sensor measures the global magnetic flux density (MFD), the relative MFD change $\Delta B_{x,y,z}$ may be obtained by subtracting the measured MFD $B_{x,y,z}$ from the mean values of the initial $N_0$ samples $B^{N0}_{x,y,z}$ ($N_0$ could be set as 300), i.e., $\Delta B_{x,y,z}=B_{x,y,z}-B_{x,y,z}^{N_0}/N_0$. To reduce the noise of the signals, a moving average may be added to filter all the signals with a window size of 6.

Control Strategy

Some embodiments may relate to a two or more fingered gripper, wherein each gripper is provided with a GTac sensor. To achieve closed-loop grasping using the two fingered gripper with integrated GTac to grasp fragile objects, a threshold Tg is used to control the gripping force exerted by the fingers via feedback from GTac on each fingertip of the gripper. To grasp the object, the corresponding motor, $m_f$ of each finger f, rotated 1 increment (1.5°) to drive a rack and pinion gear to conduct finger closure until the leveraged GTac signals $g_f > T_g$. The leveraged GTac signals can be derived by:

$$g_f = \sqrt{\Delta B_f^{x2} + \Delta B_f^{y2} + \left[ a\Delta B_f^z + (1-a)\sum_{r=1}^{4}\sum_{c=1}^{4} R_f^{r,c} \right]} \quad (5)$$

where f=1 denotes a left finger and f=2 denotes a right finger. In a tweezers use experiment values were set as $Tg_{high}$=900, $Tg_{low}$=500 and a=0.3 for tweezers grasping experiments. When $g_1 < Tg_{high}$ and $g_2 < Tg_{high}$, both fingers started closing until $g_1 > Tg_{high}$ and $g_2 > Tg_{high}$. After 2 seconds, both fingers started releasing the object but holding the tweezers until $g_1 < T_{glow}$ and $g_2 < T_{glow}$. In an egg grasping experiment, Tg was set to 700 and a to 0.3.

GTac-Gripper: A Reconfigurable Under-Actuated Multi-Fingered Robotic Gripper with Tactile Sensing Some embodiments of the disclosure relate to wider range of objects. Thus, presented herein is a robotic gripper with a reconfigurable mechanism and tactile sensors (GTac) integrated into the fingers and palm. The gripper may also be referred to as GTac-Gripper. Each finger of the GTac-Gripper may consist of one or more, and presently two, phalanges with a 2 DOF underactuated design and a metacarpophalangeal (MCP) joint. A GTac-Gripper with four adaptive fingers may perform 5 grasping configurations and obtain 228 tactile feedback signals (normal and shear forces) at 150 Hz. The gripper can grasp various everyday objects and achieve in-hand manipulation including translation and rotation with closed-loop control. In a Yale-CMU-Berkeley (YCB) benchmark assessment, the gripper achieved a score of 93% (round objects), 0% (flat objects), 78% (tools), 90% (articulated objects), and 65% in total The GTac-Gripper provides a new hardware design and could be beneficial to various robotic applications in the domestic and industrial fields.

Gripper Design

Figure 14:
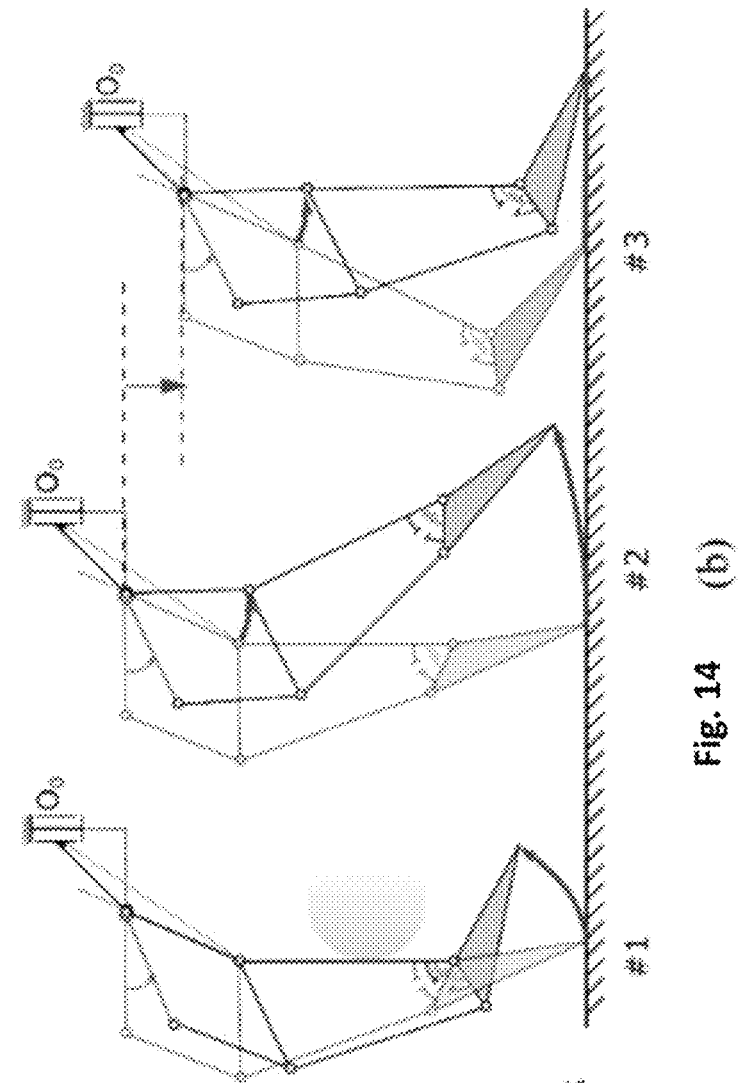
FIG. 14 illustrates a finger mechanism structure of a gripper incorporating a force sensor.
Figure 14:
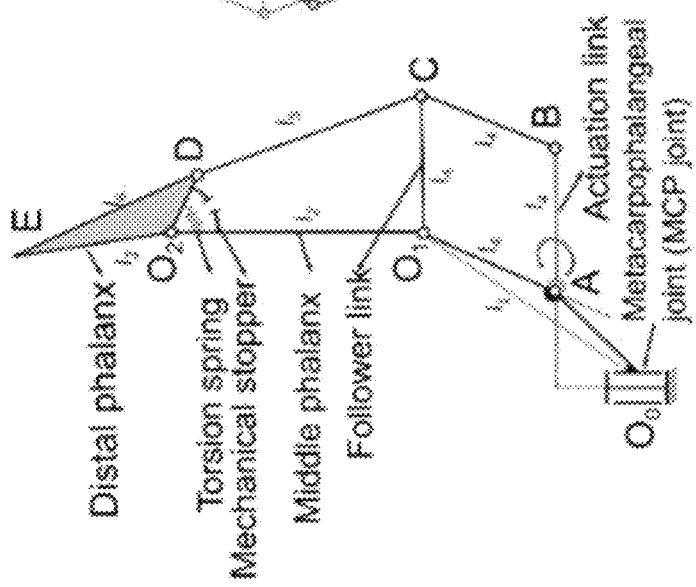
Figure 14:
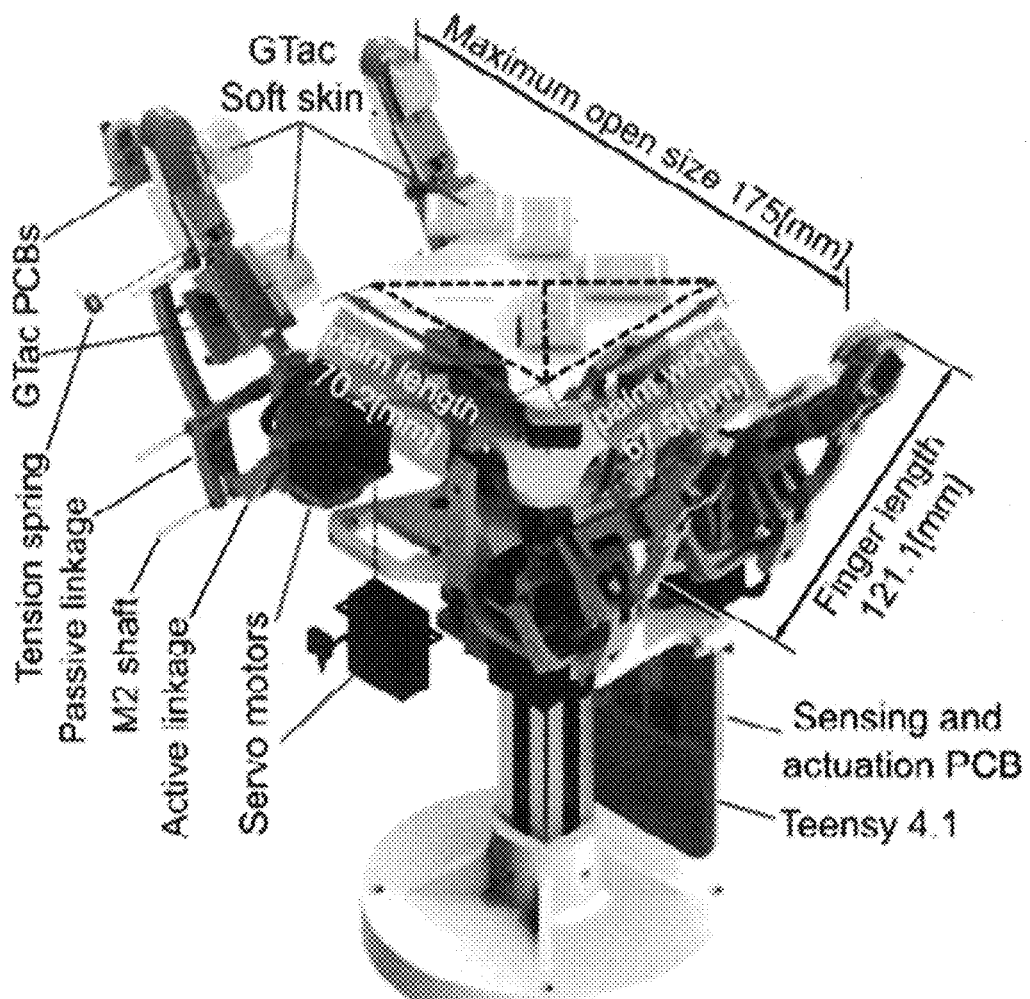
Figure 14:
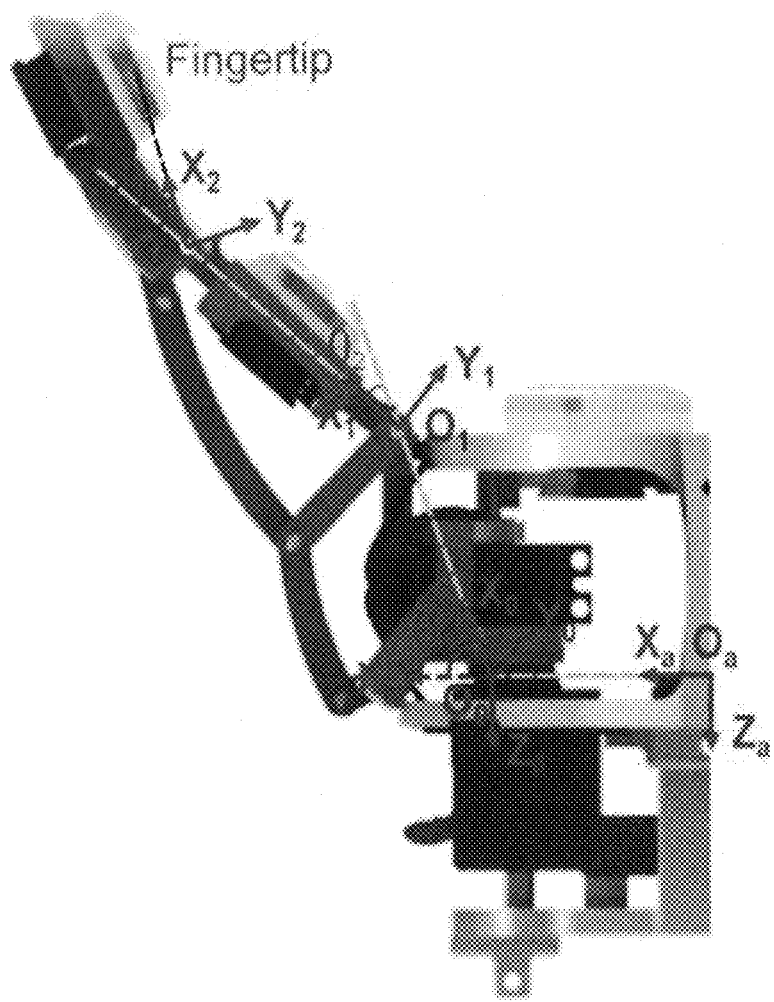

A 2 DOF linkage-driven underactuated design was adopted for the finger with two phalanges. The underactuated mechanism was constructed by stacking the 4-bar mechanism with the parallelogram mechanism as illustrated in FIG. 14(a). Other configurations are possible, are intended to fall within the scope of the present teachings. The actuation link I1 is connected to a servo motor. With the 1-DOF parallelogram mechanism, the rotation of the active link AB is transmitted to the motion of the link O1C, which actuates the 2-DOF underactuated four-bar linkage O1CDO2.

A preloaded torsion spring T in the joint O2 is used to maintain the distal phalanges fully extended. The mechanical stopper kept the distal phalanges aligned under the extension of spring when no external force was applied to the phalanges. Joint O0 functioned as the metacarpophalangeal joint of human hands, allowing each finger to change its orientation with respect to the central axis of the palm independently. The trajectory of the fingertip as the finger flexes would be determined by external constraints. FIG. 14(b) illustrates the three situations during a finger flexion. In #1, the contact occurs at the middle phalanx. In #2, two phalanges behave as a rigid body and rotate around a fixed point. In #3, the fingertip moves linearly when the finger is pressed before flexion.

FIG. 14(c) shows the partial exploded view of a GTac-Gripper. It has 4 fingers and 8 motors, with tactile sensors integrated into the distal phalanx, middle phalanx of the fingers, and the palm. Each finger has one motor for finger flexion/extension and one for reorientation. The soft silicone skin of GTac sensors partially covered the finger surface and provided structural compliance improving grasping stability during object grasping.

A workspace analysis is performed to evaluate the manipulation range and dexterity of the GTac-Gripper. The motions of joint O1 and O2 are coupled because of the underactuated finger design. To analyze the reachable workspace of the fingertip, we assumed that the motion range of the fingertips depends on the mechanical limits due to the underactuated characteristics. Thus the finger kinematic model was configured as a RRR mechanism and the coordinates were placed for obtaining Denavit-Hartenberg (DH) parameters. As shown in FIG. 14(d), each finger can rotate around joint O0 in the $X_0Y_0$ plane by 180°. Link O1C and link O2D can achieve a motion range of 85' in the $X_1Y_1$ plane and 70° in the $X_2Y_2$ plane respectively. The DH parameters for the finger were listed in the Table I and can be used by Equation (6) and (7) to obtain the workspace of fingertips. The transformation matrix was defined as $$_3^0T = {}_1^0T\,{}_2^1T\,{}_3^2T \quad (6)$$

with $$_i^{i-1}T = \begin{bmatrix} c\theta_i & -s\theta_i & 0 & a_{i-1} \\ s\theta_i c\alpha_{i-1} & c\theta_i c\alpha_{i-1} & -s\alpha_{i-1} & -s\alpha_{i-1}d_i \\ s\theta_i s\alpha_{i-1} & c\theta_i s\alpha_{i-1} & c\alpha_{i-1} & c\alpha_{i-1}d_i \\ 0 & 0 & 0 & 1 \end{bmatrix} \quad (7)$$

TABLE I standard DH parameters for the finger

| Link i | $\alpha_{i-1}$ [mm] | $\alpha_{i-1}$ [deg] | $d_i$ [mm] | $\theta_i$ (joint limits [deg]) |
|---|---|---|---|---|
| 1 | 14.2 | 90 | 40.2 | $q_1$(−45-135) |
| 2 | 0 | 0 | 42 | $q_2$(50-135) |
| 3 | 0 | 0 | 29.2 | $q_3$(22.5-92.5) |

By applying Monte Carlo numerical algorithm, the workspace of each fingertip was obtained.

Tactile Sensor Integration

Figure 15:
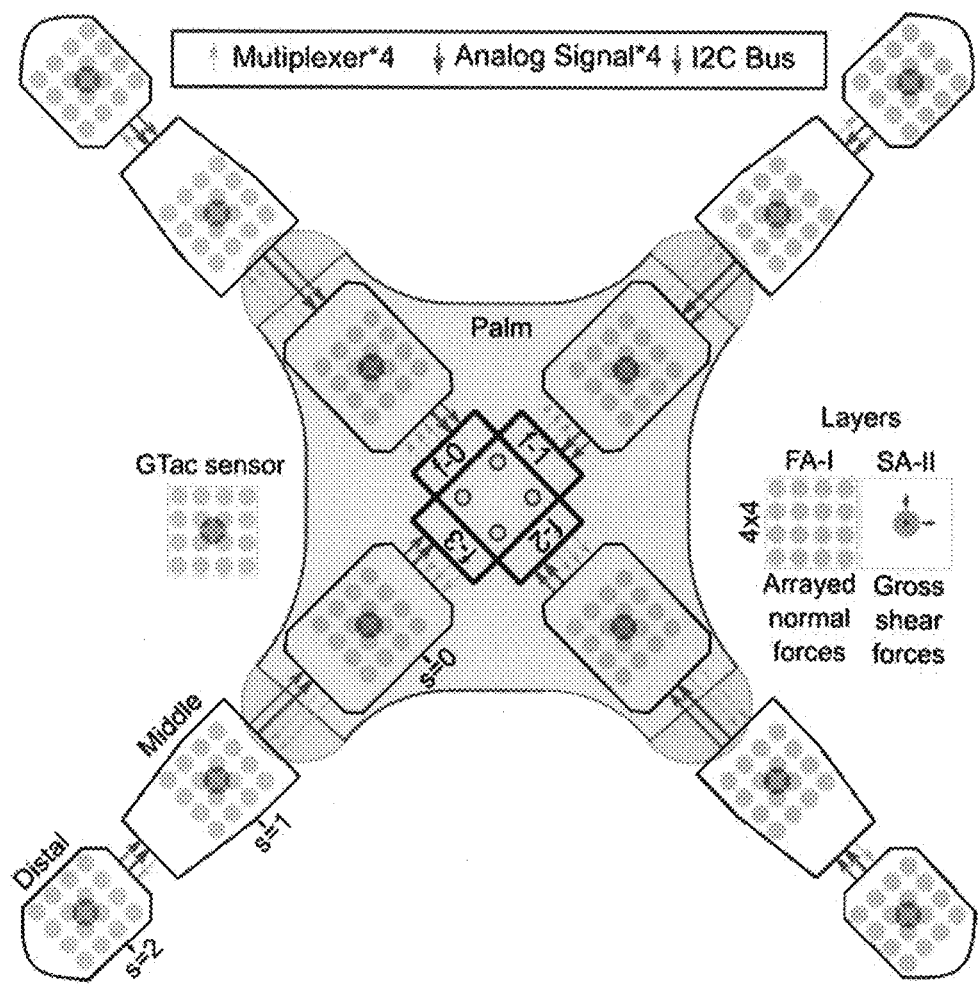
FIG. 15 illustrates an overview of tactile sensing solution and signal transmission for a gripper incorporating a force sensor.

The GTac sensors are integrated at appropriate locations to measure contact forces applied by the hand. Presently, those locations are in the distal phalanx and the middle phalanx of each finger and in the palm of the GTac-Gripper, as shown in FIG. 15. Each GTac sensor can perceive a plurality of tactile sensing signals, presently 19 tactile sensing signals (16 from the FA-I layer and 3 from the SA-II layer). A GTac-Gripper with 12 GTac sensors, for example, can acquire 228 tactile sensing signals at 150 Hz. In each GTac sensor, a Hall sensor (MLX90393) placed at the center of the front is used to acquire the local magnetic flux density and transmit the digital signals—e.g. in I2C bus. Multi-channel operational amplifiers, presently four-channel operational amplifiers (MCP6004), are used to acquire analog signals from the piezoresistors. There are four parallel sensing branches for the four fingers of the GTac-Gripper. The uploading multiplexer signals, the downloading digital and analog signals, and power supply (5V) are serially transmitted in each branch. 12-pin, 16-pin, and 20-pin 0.5 mm pitch jumper cables are used to connect the GTac sensors at the distal phalanx (s=2), middle phalanx (s=1), and the palm (s=0), respectively.

Versatile Grasping Configurations

Figure 16:
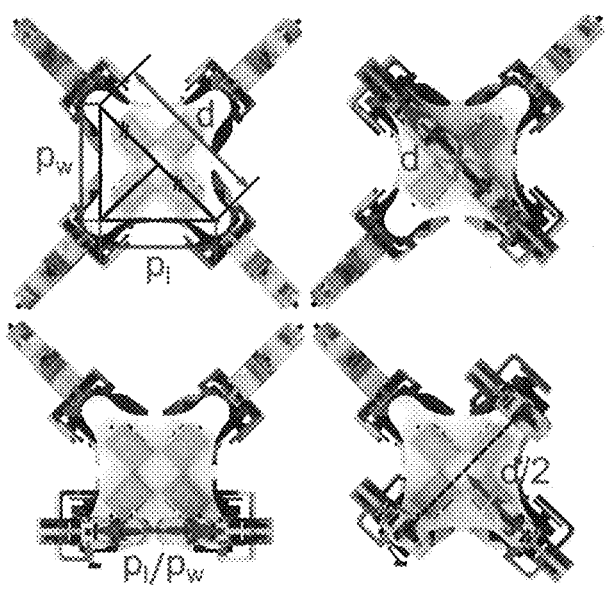
FIG. 16 illustrates various grasping configurations of a gripper incorporating a force sensor.
Figure 16:
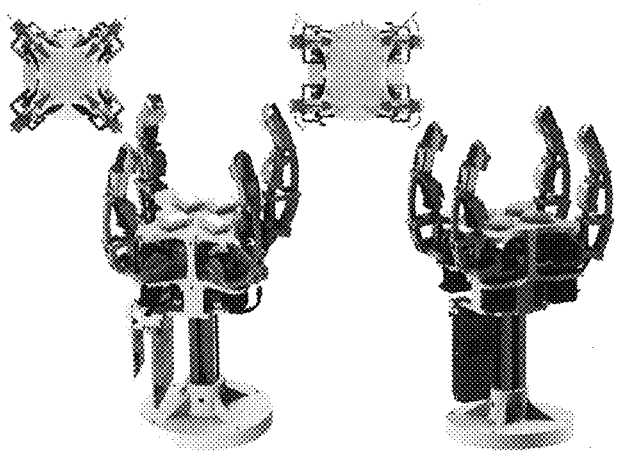
Figure 16:
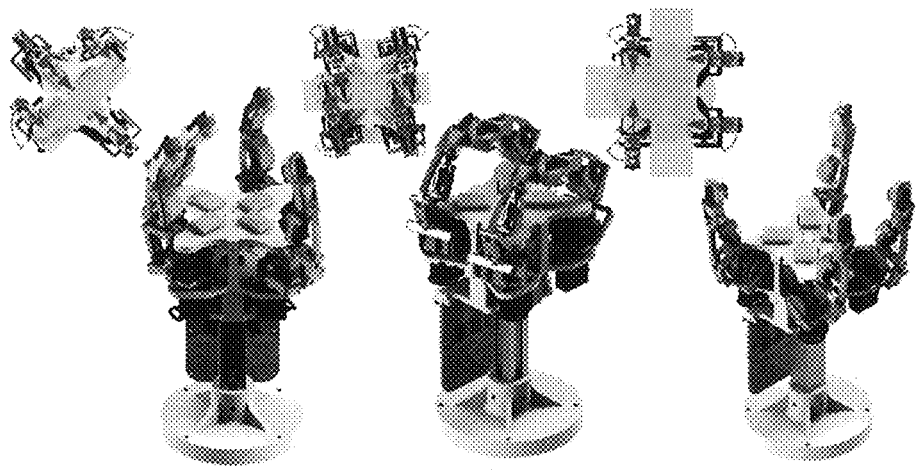

The inter-finger distance between the finger bases are related to the gripper's stability and grasping/manipulation capabilities in precision grasping (pinch) and caging, especially for underactuated mechanisms. Similarly, the gripper can continuously control its MCP joints to accomplish different grasping configurations and change the inter-finger distance. As shown in FIG. 16(*a*), there are four distinct inter-finger distances, pl, pw, d, and d/2. Five grasping configurations can be achieved with the different inter-finger distances (FIG. 16(*b*)). The gripper can perform cage grasp (#1) for spherical or irregular objects, parallel pinch (#2 and #3) for cylindrical objects or small objects, clasped pose (#4) when the stability of grasping is emphasized, and T-shape grasping (#5) for T-shaped objects such as the drill.

GTac-Hand: A Robotic Hand with Integrated Biomimetic Tactile Sensing and ECS Recognition Capabilities Some embodiments relate to a robotic hand with integrated GTac sensors to obtain tactile feedback from the fingers and palm of the hand. Such embodiments may be referred to as GTac-Hand. GTac-Hand may provide 285 tactile measurements. The GTac-Hand can grasp delicate objects and precisely identify their ECSs (extrinsic contact states) via human-like patterning and learning models, which can be used for robots to perform challenging tasks, such as delicate object grasping, object handovers, and ball-hit recognition.

Figure 17:
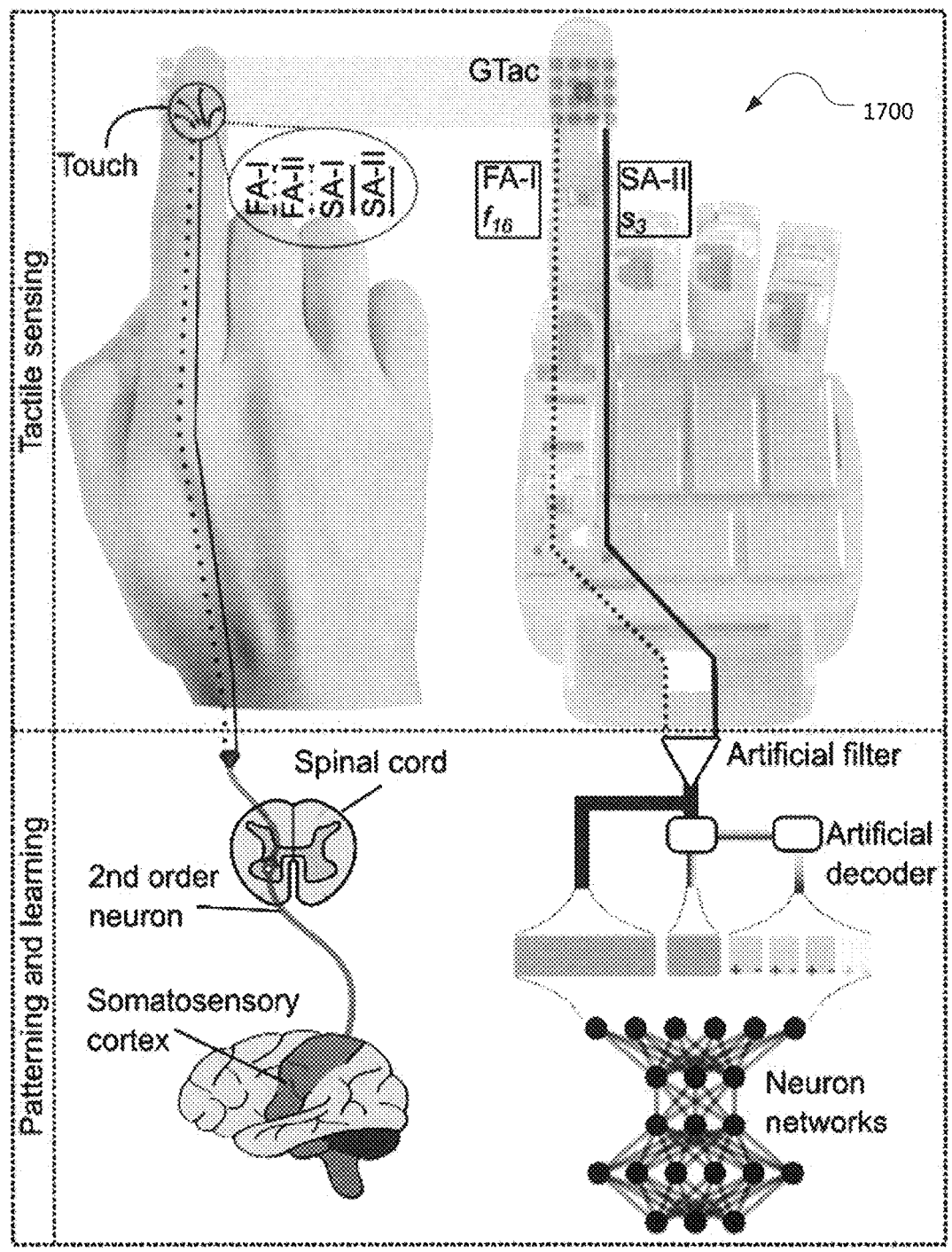
FIG. 17 illustrates a robotic hand incorporating force sensors and analogizes the robotic hand with a human hand.

In some embodiments, GTac-Hand provides (i) tactile sensors with human skin-like normal force (distributed) and shear force (gross) sensing capabilities, and (ii) effective sensory interpretation methods such as those of the human somatosensory system. FIG. 17 illustrates a GTac-Hand 1700 and analogizes the structure and operation of the GTac-Hand with a human hand. GTac-Hand 1700 has integrated GTac into the fingers and palm of an anthropomorphic robotic hand that can identify the nine typical ECSs of grasped objects in real time. The GTac-Hand may identify the ECS of a held object via human-like patterning and deep learning models operating on the sensor data generated by the GTac-Hand. Similar to the human sensory-motor controller, the GTac-Hand can perform challenging tasks such as closed-loop grasping and object handovers according to the identified ECS of the grasped object.

Mechatronic Design of the GTac-Hand

GTac-Hand integrates electronics for sensing and actuation in the wrist. There are two PCBs, where one PCB is used for collecting the signals from the GTac sensing PCB, and another for power supply, actuation PCB as illustrated in FIG. 3. The sensing PCB may have five 20-pins jump cable connectors for each GTac-finger branch. A microcontroller, Teensy 4.1, is directly connected to the sensing PCB to produce the digital data and functions as a low-level controller of the motors and opens the serial port and CAN bus for communication with the core processing unit.

Figure 18:
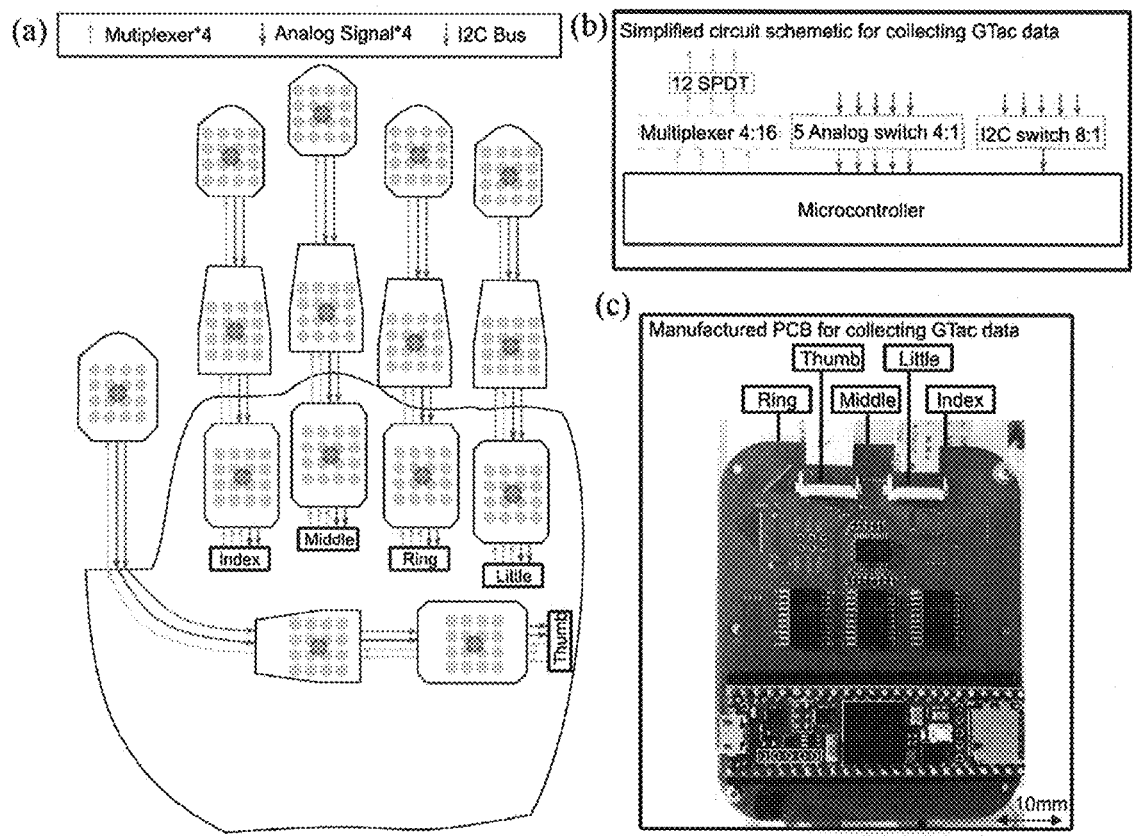
FIG. 18 illustrates a force sensors integration and data transmission for a robotic hand.
Figure 18:
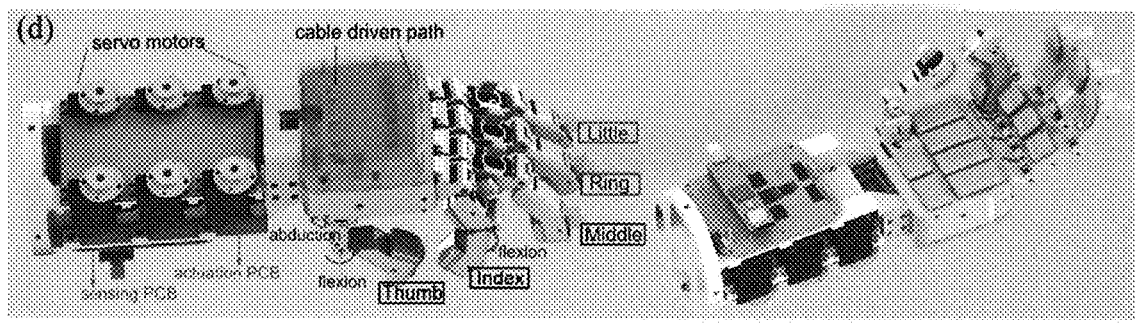

The anthropomorphic hand may be under-actuated and cable-driven as illustrated in FIG. 18(*d*), where 10 rotational joints are actuated by six motors. The shape, size, kinematics, and appearance are similar to those of the human hand. The robotic hand integrates all the electronics and actuation transmissions within the hand. The index, middle, ring, and little fingers have the same design, except for the varied length of the distal section and have two rotational joints, namely proximal interphalangeal joint and metacarpophalangeal joint. To reduce the redundancy of the actuated joints for grasping and manipulation, the distal and middle phalanges are connected for each finger. The thumb is provided with two degrees of freedom, namely radial abduction/adduction of the carpometacarpal joint and the flexion/extension of the metacarpophalangeal joint, for obtaining human-like dexterity and mechanical synergies.

Signal Acquisition and Processing

According to the features of GTac sensor, the GTac-Hand may obtain 285 tactile signals from the fingers and palm. The sensing PCB that can acquire all the signals at 150 Hz. First, 300 samples may be collected and the mean value of the tail 100 samples ($\overline{X}$, 0.67 s data) may be calculated to initialize GTac signals. The relative values of the tactile signals can be acquired by subtracting the mean values $\overline{X}$. A moving average (window size: 6) may be added to reduce the noise of the signals. A filtering algorithm may be implemented to reduce the magnetic disturbance to the SA-II signals of GTac. The signal processing algorithm was only used in the closed-loop grasping phase. Two thresholds on both the FA-I and SA-II data on each GTac unit could be used to estimate the contact status. If either of the leveraged FA-I signals, $\tilde{g}_{s,f|FA-I} = \Sigma_{r=1}^{4} \Sigma_{c=1}^{4} R_{s,f}^{r,c}$, or SA-II signals, $|\tilde{g}_{s,f|SA-II}| = \sqrt{\Delta B_{s,f}^{x^2} + \Delta B_{s,f}^{y} + \Delta B_{s,f}^{z}}$ was above the thresholds (T1 and T2), the section, s, of a finger f was regarded as contacted. The SA-II signals were valid only when the responding finger section was in contact. Therefore, the change in magnetic flux density due to the finger orientation relative to the global coordinate was discarded when no contact was detected. The pseudocode for the data processing is described in Algorithm 1.

---

Algorithm 1 GTac signal processing

INITIALIZATION
  i = 0
  while i < $N_0$ do

-continued

Figure 19:
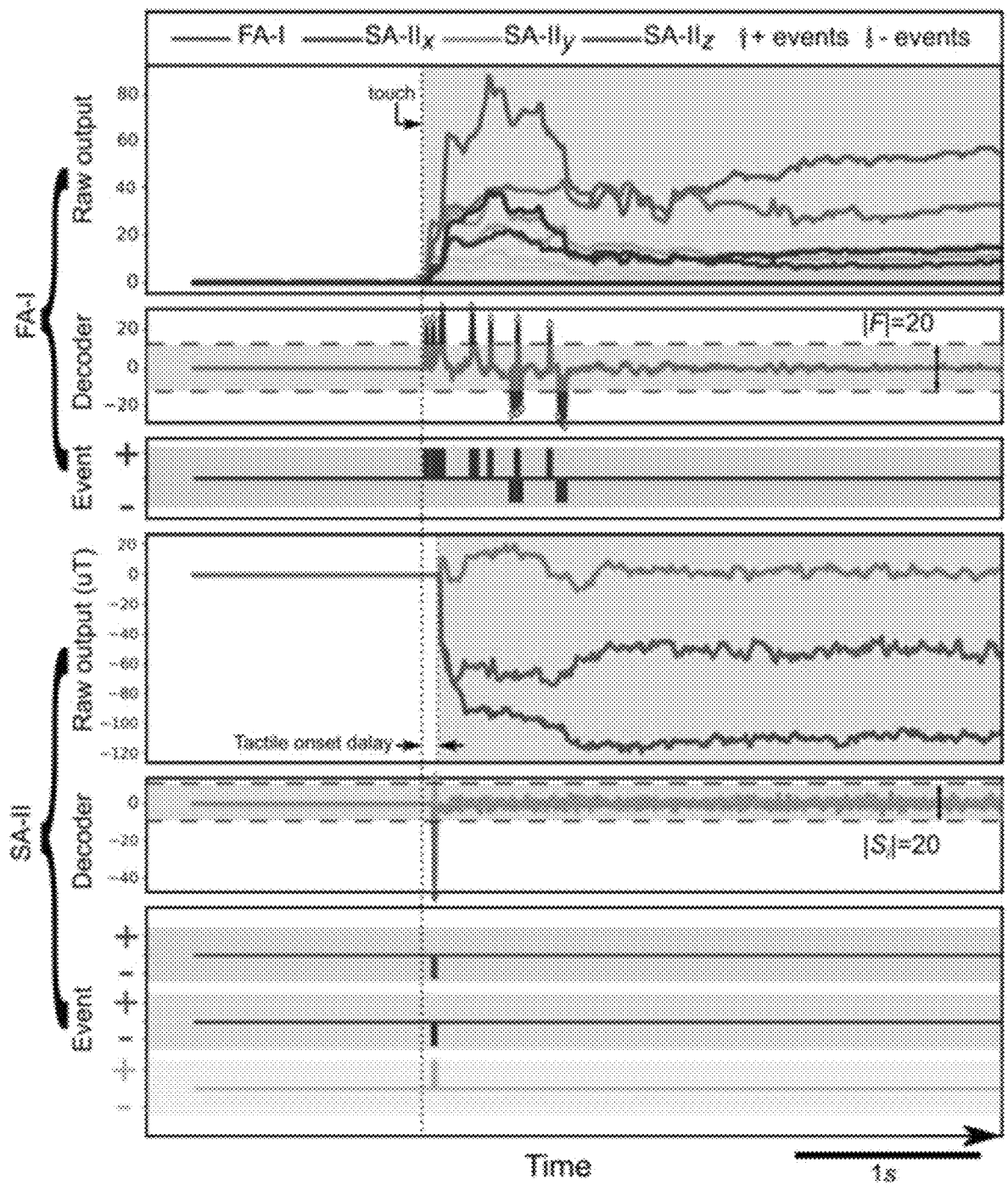
FIG. 19 illustrates a data flow graph at the index distal finger section when the robotic hand grasping a cylinder-shaped object in a force-closed manner.

Algorithm 1 GTac signal processing $g_i^{raw}$ = readout( )
i = i + 1
$$\overline{X} = \sum_{i=-L_1/3}^{-1} g_i^{raw}/(L_1/3)$$
MAIN LOOP
  while true do
    $g^{raw}$ = readout( )
    $\hat{g} = g^{raw} - \overline{X}$ (initialised signals)
    put $\hat{g}$ in tail of moving average $g^6$, then
    $\tilde{g} = \Sigma g^6/6$, (filtered signals).
    if $\tilde{g}_{s,f|FA-I} < T_1$ and $|\tilde{g}_{s,f|SA-II}| < T_2$ then
      $\tilde{g}_{s,f|SA-II} = 0$ Patterning and Learning Models Based on the characteristics of GTac, the 285 tactile sensing signals, consisting of 240 FA-I type signals and 45 SA-II type signals from 15 GTac units (GTac #=f×4+s, f∈{0,1,2,3,4}, s∈{0,1,2}.) were converted to a 15×19 signal matrix (Feature #: 0-18). According to the signalling scheme of GTac, encoding neuron-inspired tactile representations are suitable for implementation in it because GTac can incorporate both FA-I type and SA-II type tactile signals while maintaining synchronised temporal precision in each finger section. Inspired by neural tactile pattern representations in the human somatosensory system GTac-Hand incorporated several decoders to extract biomimetic tactile information by incorporating distributed FA-I signals ($SR=\Sigma_{r=1}^{4} \Sigma_{c=1}^{4} R^{r,c}$), integrating FA-I and SA-II signals ($SF A^{x,y,z}=\Delta B^{x,y,z}/SR$), obtaining the dynamic time-varying rate ($dFA=SR_n-SR_{n-1}$ $dSA^{x,y,z}=\Delta B_n^{x,y,z}-\Delta B_{b-1}^{x,y,z}$ at the $n_{th}$ sampling moment), and producing tactile events as illustrated in FIG. 19.

Figure 20:
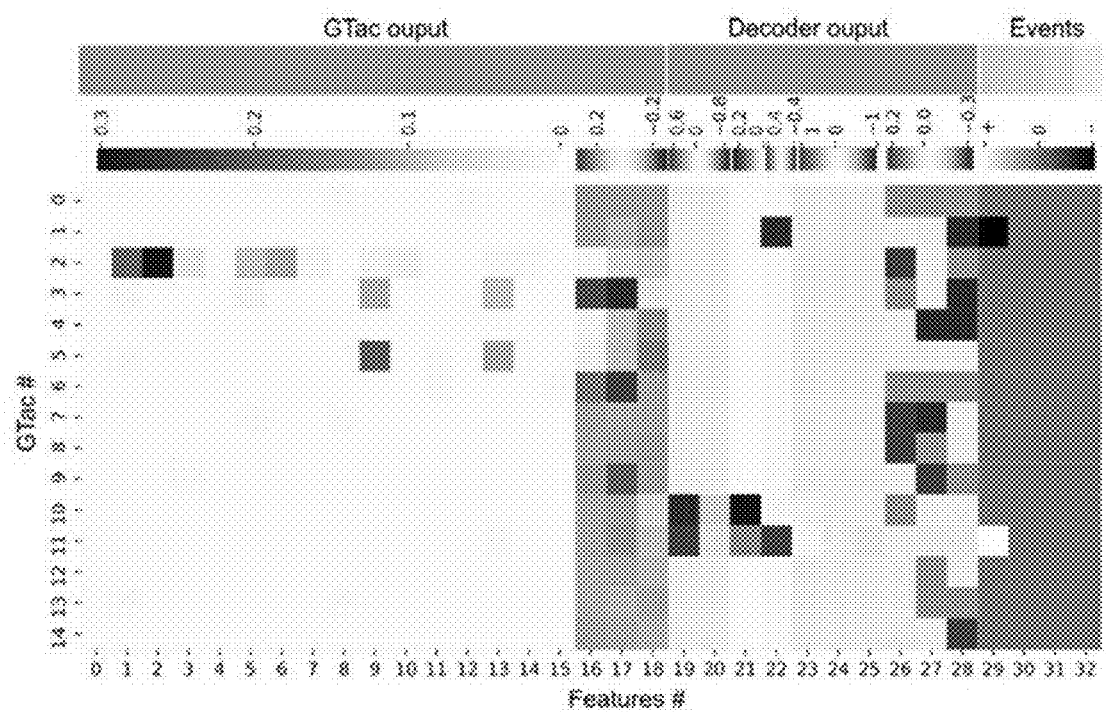
FIG. 20 illustrates tactile sensing signals and a CNN architecture used to identify the 9 dominant ECSs.
Figure 20:
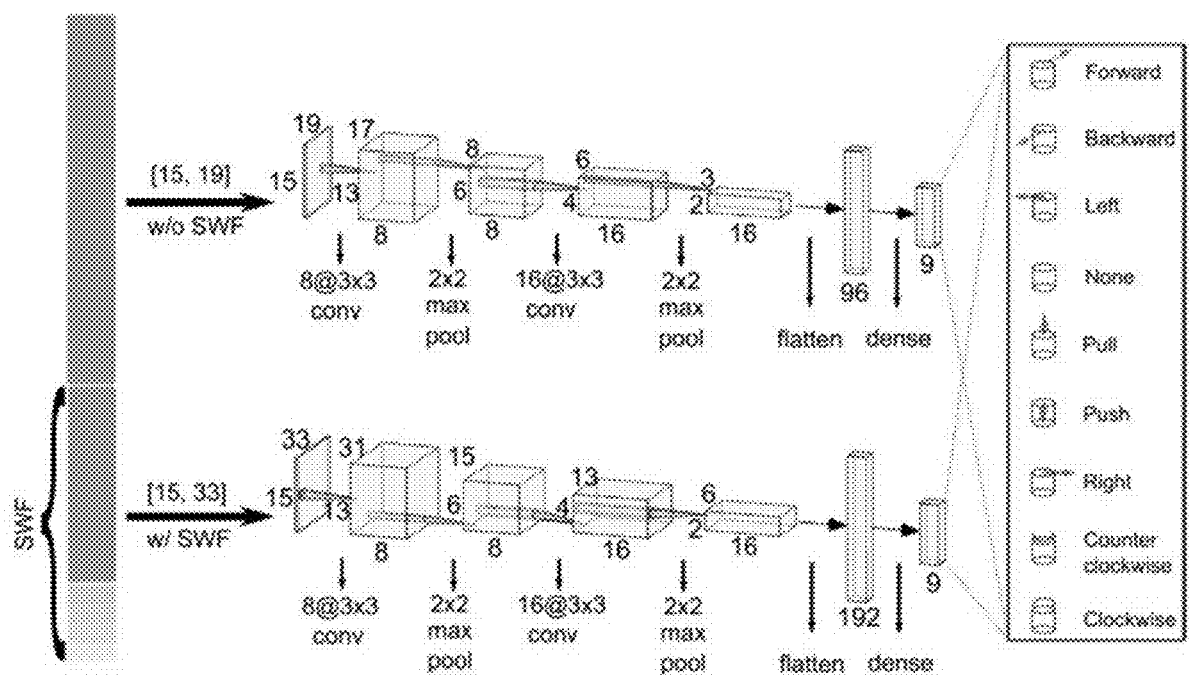

The tactile events of the corresponding layer were captured when the time-varying rate exceeded the boundary in a predefined threshold, where |F|=20 for the FA-I layer and $|S^i|=20$, i∈{x, y, z} for the SA-II layer in the in the tri-axis. The extracted tactile information was independent of each finger section. Therefore, we referred to them as section-wise features (SWFs). As shown in FIG. 20(a), the models included 14 SWFs consisting of 10 decoder outputs and four tactile events as the optional input (w/ SWF or w/o SWF) of a machine learning-based classifier with the original 19 GTac signals. In total, there were 33 channels of data, namely flattened Rr,c (Feature #: 0-15), ΔBx,y,z (Feature #: 16-18), xe and ye (Feature #: 19-20), SR (Feature #: 21), dF A (Feature #: 22), SF Ax,y,z (Feature #: 23-25), dSAx,y,z (Feature #: 26-29) and tactile events (Feature #: 30-33) as shown in FIG. 20.

Supervised learning model training and validation: To identify the nine ECSs via tactile feedback, two supervised learning models, i.e., convolutional neural networks (CNN) and quadratic discriminant analysis (QDA), were implemented. The Keras library in Python, based on TensorFlow, could be used to construct and train the CNN-based model (FIG. 20(b)). After tuning the parameters of the CNN model to reduce its complexity (number of trainable parameters) and maintain its performance (validation accuracy), an architecture consisting of two main convolutional blocks, a flattened layer regulated with a "dropout" rate of 0.5 and a fully connected dense layer was provided by the embodiments. Each convolutional block was assembled by a 3×3 convolutional kernel, a rectified linear unit (ReLU), to introduce nonlinearity, and a 2×2 max-pooling layer. There were 2121 and 2985 trainable parameters in the CNN model for the input options, w/o SWF and w/SWF, respectively. During the learning process, we let the learning rate as 0.001 and batch size as 12 using the Adam optimiser and trained the model for 15 epochs. To compare the performance with the CNN-based model, the QDA-based classifier was implemented using the scikit-learn library that determines the quadratic decision boundary between the classes in the feature spaces based on Bayes' theorem. The configuration of the QDA model was the default configuration. To verify the supervised learning models, we implemented 5-fold cross-validation, wherein the dataset was split into five equal pieces after randomisation, four pieces were used to train the model, and the remaining one was used to validate the trained model. This estimation process was iterated five times.

Figure 21:
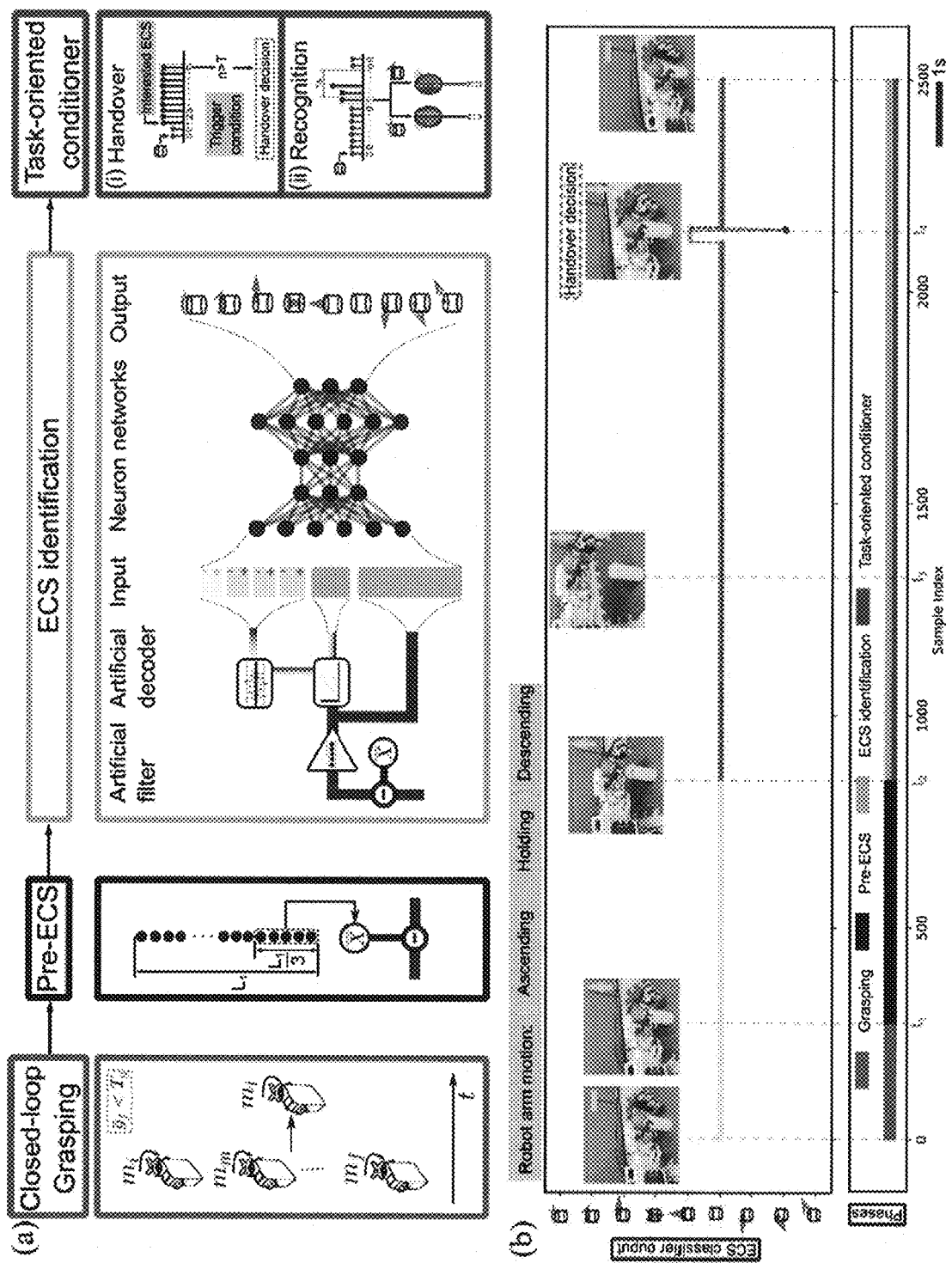
FIG. 21 illustrates experiments performed using a robotic hand incorporating the force sensor.

FIG. 21(a) illustrates four phases in the control loop of the GTac-Hand. FIG. 21(b) illustrates Experiment of grasping and handover of an egg using the learned NN-ECS model and the handover controller.

Figure 22:
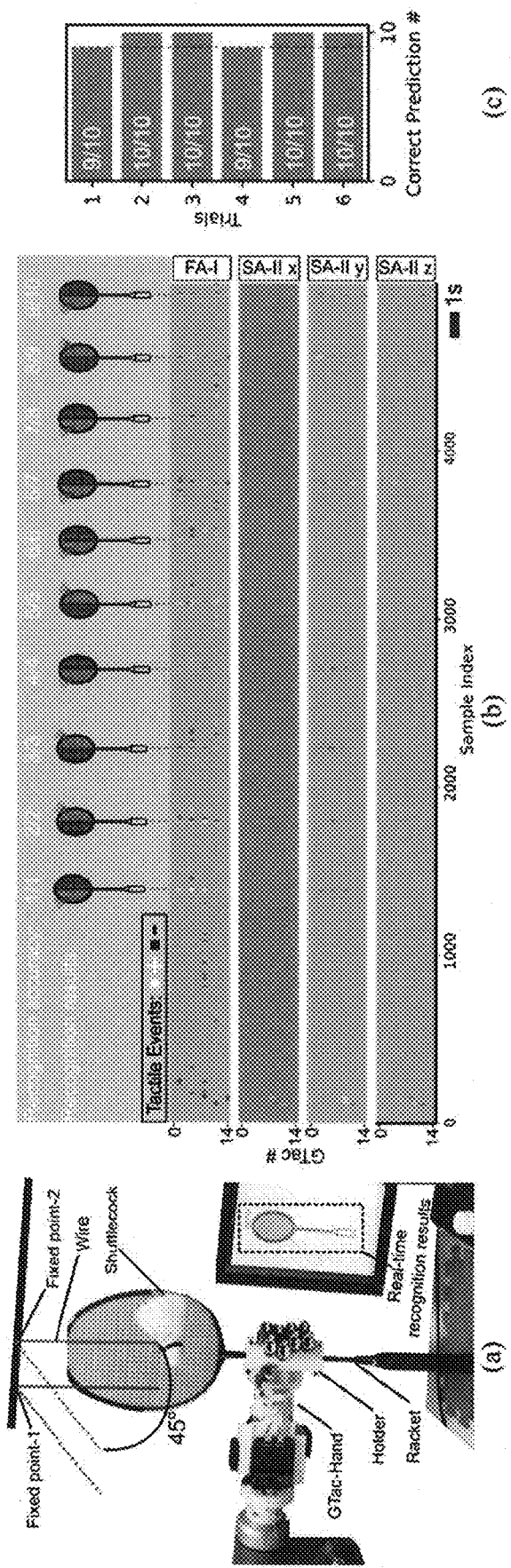
FIG. 22 illustrates an experimental setup of applying ECS identification capabilities to perform ball-hit recognition.

FIG. 22(a) illustrates an experimental setup of applying ECS identification capabilities to perform ball-hit recognition. FIG. 22(b) illustrates recognition results and decoded tactile events representations of one trial experiment. FIG. 22(c) illustrates recognition accuracy of all the six trials of ball-hit recognition experiments conducted (96.7% accuracy over 60 trials in total).

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Although this disclosure describes or illustrates particular embodiments as providing particular advantages, particular embodiments may provide none, some, or all of these advantages.

The invention claimed is:

1. A force sensor comprising:
   a contact arrangement for transmitting a contact force to a force sensor assembly,
   the force sensor assembly comprising:
   a first sensor sensing, and producing an output from, a normal contact force component of the contact force;
   a body moveable on transmission of the contact force to the force sensor assembly; and
   a second sensor for sensing, and producing an output from, a relative displacement of the body relative to the second sensor, a tri-axis contact force being determined from the relative displacement,
   wherein the body comprises a magnet and the second sensor is one or more Hall effect sensors, and
   wherein the force sensor forms a multi-layer structure with a top layer comprising the contact arrangement, second layer and a first layer between the top layer and second layer, the first layer and second layer comprising respectively different ones of the first sensor and second sensor, wherein the second sensor is in the second layer.

2. The force sensor of claim 1, wherein the contact arrangement comprises a deformable substrate that deforms under the contact force.

3. The force sensor of claim 2, wherein the deformable substrate is an elastomeric substrate.

4. The force sensor of claim 1, wherein the body comprises a plurality of magnets.

5. The force sensor of claim 1, wherein the body comprises a rigid layer comprising the magnet or magnets, and a deformable layer one side of which is fixed to the rigid layer and an opposing side of which is fixed relative to the Hall effect sensor, the deformable layer permitting displacement, under the contact force, of the rigid layer relative to the Hall effect sensor.

6. The force sensor of claim 1, wherein the second sensor is housed in a base chamber.

7. The force sensor of claim 6, further comprising a base structure for incorporating the force sensor into a device, wherein the base chamber is incorporated into, or abuts, the base structure.

8. The force sensor of claim 1, wherein the body is embedded in a substrate between the first sensor and the second sensor.

9. The force sensor of claim 1, wherein the first sensor is a matrix piezoresistive sensor.

10. The force sensor of claim 1, wherein the body is disposed between the first layer and second layer.

11. A robotic device comprising the force sensor according to claim 1.

12. The robotic device of claim 11, being a gripper and comprising an array of said force sensors according to claim 1, arranged in a grid.

13. A robotic hand comprising:
a palm portion;
a plurality of finger portions;
a plurality of force sensors according to claim 1, located at contact points for contacting an object during use; and
a processor for:
receiving an output from each of the first sensor and the second sensor;
determining from the output, one or more fast-adapting (FA) responses and one or more slow-adapting (SA) responses; and
identifying an extrinsic contact state (ECS) of the object based on the one or more FA responses and one or more SA responses.

14. The robotic hand of claim 13, wherein identifying the ECS comprises determining a first order response and a second order response from the one or more FA responses and one or more SA responses.

15. The robotic hand of claim 14, wherein the first order response comprises one or both of a normal force and a shear force, and wherein the second order response comprises a time-varying pattern.

16. A force sensor device comprising an array of force sensors according to claim 1, arranged in a grid.

* * * * *